United States Patent
Cote

(10) Patent No.: US 12,532,820 B2
(45) Date of Patent: Jan. 27, 2026

(54) SPRINKLER APPARATUS AND SYSTEM FOR IRRIGATION

(71) Applicant: Kristy Cote, Cochrane (CA)

(72) Inventor: Cameron Cote, Cochrane (CA)

(73) Assignee: Kristy Cote, Alberta (CA)

( * ) Notice: Subject to any disclaimer, the term of this patent is extended or adjusted under 35 U.S.C. 154(b) by 754 days.

(21) Appl. No.: 17/675,626

(22) Filed: Feb. 18, 2022

(65) Prior Publication Data

US 2022/0167573 A1 Jun. 2, 2022

Related U.S. Application Data

(62) Division of application No. 16/431,226, filed on Jun. 4, 2019, now abandoned, which is a division of
(Continued)

(51) Int. Cl.
*A01G 25/16* (2006.01)
*A01G 25/02* (2006.01)
(Continued)

(52) U.S. Cl.
CPC .............. *A01G 25/16* (2013.01); *A01G 25/02* (2013.01); *B05B 1/02* (2013.01); *B05B 1/04* (2013.01);
(Continued)

(58) Field of Classification Search
CPC ....... B05B 12/02; B05B 12/04; B05B 1/3026; B05B 1/323; B05B 3/021
See application file for complete search history.

(56) References Cited

U.S. PATENT DOCUMENTS

| 2,209,961 A | 8/1940 | De Lacy-Mulhall |
| 2,290,783 A | 7/1942 | Turpin |

(Continued)

FOREIGN PATENT DOCUMENTS

| CA | 1105806 A1 | 7/1981 |
| WO | 2008062398 A1 | 5/2008 |

OTHER PUBLICATIONS

AU Examination Report dated Feb. 3, 2019 in AU Patent Application No. 2014391079, 7 pages.
(Continued)

*Primary Examiner* — Tuongminh N Pham
(74) *Attorney, Agent, or Firm* — Heslin Rothenberg Farley and Mesiti P.C.; Victor A. Cardona, Esq.

(57) ABSTRACT

A sprinkler apparatus, a flow rate control valve assembly, and a sprinkler irrigation system for providing an even distribution of water across an asymmetrically shaped water receiving area. The sprinkler apparatus comprises a pop-up sprinkler head with a base housing for confiningly receiving a pressurized water flow that actuates a nozzle housing slidingly and rotationally cooperating with the base housing to pop-up into an operating position for discharge of water through at least one pair of nozzle assemblies. The pair of nozzle assemblies comprise an upper nozzle assembly and a lower nozzle assembly near the top end of the nozzle housing. The upper nozzle assembly controllably projects the pressurized water flow for a precisely set distance, while the lower nozzle assembly comprises a vertical slit-shaped aperture through which water is discharged in a curtain effect. Together, the pair of nozzle assemblies achieve a substantially uniform elliptical linear spray pattern with a bias to outermost end. A flow rate control valve assembly is further described and comprises a flow control valve assembly that can be fluidly coupled to a pop-up sprinkler head to controllably supply the pressurized water flow, the flow
(Continued)

control valve assembly comprising a water inlet fluidly coupled to a water supply and a water outlet fluidly coupled to the pop-up sprinkler head, the water outlet cooperatively engaging with a rotary disc valve having a tapered passage wherein sliding rotation of the rotary disc valve incrementally adjusts the valve between an opened position and a closed position to control the pressurized water flow through the water outlet.

10 Claims, 23 Drawing Sheets

Related U.S. Application Data application No. 15/303,706, filed as application No. PCT/CA2014/051271 on Dec. 31, 2014, now abandoned.

(60) Provisional application No. 61/979,355, filed on Apr. 14, 2014.

(51) Int. Cl.
| | | |
|---|---|---|
| *B05B 1/02* | (2006.01) | |
| *B05B 1/04* | (2006.01) | |
| *B05B 1/30* | (2006.01) | |
| *B05B 1/32* | (2006.01) | |
| *B05B 3/02* | (2006.01) | |
| *B05B 12/12* | (2006.01) | |
| *B05B 15/18* | (2018.01) | |
| *B05B 15/72* | (2018.01) | |
| *B05B 1/14* | (2006.01) | |
| *B05B 12/00* | (2018.01) | |

(52) U.S. Cl.
CPC ............ *B05B 1/3026* (2013.01); *B05B 1/323* (2013.01); *B05B 3/021* (2013.01); *B05B 12/12* (2013.01); *B05B 15/18* (2018.02); *B05B 15/72* (2018.02); *B05B 1/14* (2013.01); *B05B 12/00* (2013.01)

(56) References Cited

U.S. PATENT DOCUMENTS

| | | |
|---|---|---|
| 2,913,006 A | 11/1959 | Heymann |
| 3,007,391 A | 11/1961 | Reynolds et al. |
| 3,323,774 A | 6/1967 | Wilson |
| 3,575,347 A | 4/1971 | Carlson |
| 3,716,192 A | 2/1973 | Hunter |
| 5,004,157 A | 4/1991 | Martell |
| 5,299,742 A | 4/1994 | Han |
| 5,526,982 A | 6/1996 | McKenzie |
| 5,598,977 A | 2/1997 | Lemme |
| 5,642,861 A | 7/1997 | Ogi et al. |
| 6,464,150 B1 | 10/2002 | Zimmer et al. |
| 6,688,535 B2 | 2/2004 | Collins |
| 7,017,831 B2 | 3/2006 | Santiago et al. |
| 8,181,889 B2 | 5/2012 | Shahak |
| 2002/0125338 A1 | 9/2002 | Collins |
| 2009/0057590 A1 | 3/2009 | Kok-Hiong et al. |
| 2011/0083748 A1* | 4/2011 | Ellis ..................... F16K 27/003 137/561 R |
| 2013/0126635 A1 | 5/2013 | Klinefelter et al. |

OTHER PUBLICATIONS

Canadian Examination Report in Canadian Patent Application No. 2,944,795 dated May 5, 2021, 4 pages.
International Search Report and Written Opinion prepared by the Canadian Intellectual Property Office on Mar. 16, 2015, for International Application No. PCT/CA2014/051271.
European Extended Search Report dated Dec. 1, 2017 in EP 3131683, 9 pages.

* cited by examiner

SPRINKLER APPARATUS AND SYSTEM FOR IRRIGATION

CROSS REFERENCE TO RELATED APPLICATIONS

This application is a divisional application of U.S. Ser. No. 16/431,226, which is a divisional application of U.S. Ser. No. 15/303,706 filed on Oct. 12, 2016, which is a national stage application under 35 U.S.C. 371 and claims the benefit of PCT Application No. PCT/CA2014/051271 having an international filing date of 31 Dec. 2014, which designated the United States, which PCT application claimed the benefit of U.S. Provisional Application No. 61/979,355 filed 14 Apr. 2014, the disclosures of each of which are incorporated herein by reference in their entirety.

FIELD OF THE INVENTION

The present invention relates to the field of water sprinkler irrigation systems and, in particular, to in-ground water sprinkler systems comprising one or more rotating pop-up heads adapted for delivering a continuous but variable rate of water flow during a rotation.

BACKGROUND OF THE INVENTION

In-ground sprinkler systems for lawns, parklands, golf courses, municipal green spaces and the like, typically comprise multiple pop-up sprinkler heads installed in a grid pattern within an area that requires watering on a frequent basis to maintain turf colour and vigor. Typically, the watering management controls are calibrated to provide delivery of a calculated precipitation rate (measured in inches per hour) across the entire grid surface area. By and large, most sprinkler heads intended for such irrigation purposes are configured to sprinkle in a circular pattern, or at least in patterns circumscribing circular arcs. For example, in-ground sprinkler systems typically utilize one or both of pop-up spray heads and/or rotary spray heads, both of which types are limited to delivering water flows in circular or alternatively in partially circular arc spray patterns under a constant pressure. Distribution of water in circular patterns results in indiscriminate watering. Specifically, the distribution of water in circular patterns results in overlap in certain areas within the grid pattern that receive excessive amounts of water and other areas that receive significantly less or no water. Thus, excessive amounts of water are delivered to achieve the target average water distribution rates with some areas being overly saturated with water and other areas receiving insufficient watering that exhibit drought stress.

Current sprinkler system designs further tend to be complex with multiple components for pressurized rotational directional delivery of water from the sprinkler head. Such designs attempt to improve water distribution by controlling the spray pattern of the nozzle combined with precise spacing of the sprinklers to provide a pre-calculated overlap to improve distribution of water over the entire area. The problem becomes more acute, however, when the area to be sprinkled is of a complex geometry (e.g., concave edges, convex edges, straight edges, and non-parallel edges) and has an asymmetric shape. Typically, in order to ensure sprinkler coverage of such irregularly shaped areas requires placement of multiple sprinkler heads over the area and complex piping to allow water to flow to each of the heads. This can increase the spray pattern overlap areas resulting in greatly reduced distribution uniformity and add additional costs and complexity of an in-ground sprinkler system. Accordingly, there remains an unmet need for a sprinkler system having suitable features that would offer improved control over watering patterns suitable to the geometry and irrigation needs of a water receiving area to achieve uniform distribution of water.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

The exemplary embodiments of the present disclosure pertain to sprinkler heads, valve assemblies, and programmable instrumentation for precisely modulating the flow rates of a supply of pressurized water for controllably irrigating a water receiving area, in particular an asymmetrically shaped water receiving area.

According to one aspect, the present disclosure pertains to a pop-up type sprinkler apparatus comprising a base housing and a nozzle housing that is retained within the base housing. The nozzle housing slidingly extends outward from the base housing when a supply of pressurized water is delivered to the sprinkler apparatus and slidingly retracts back into the base housing when the supply of pressurized water to the sprinkler apparatus is shut off. The nozzle housing has at least one nozzle assembly positioned close to or about its distal end, i.e., the end that is extendible outward from the base housing, to provide a flow of water delivered from immediately adjacent to the sprinkler apparatus to a selected distance away from the sprinkler apparatus with a bias to the outermost end. According to some embodiments, two or more nozzle assemblies may be provided close to or about the distal end of the nozzle housing. It is preferable to provide a pair of nozzle assemblies positioned close to or about the distal end of the nozzle housing.

According to certain embodiments, one of the nozzle assemblies provides an elliptical long-distance projection of pressurized water, while the other nozzle assembly provides an elliptical short-distance projection of pressurized water. In operation when receiving a supply of pressurized water, the nozzle housing rotates around its centre axis within the base housing, and can be electronically manipulated to controllably and continuously modulate the linear distance, i.e., wetted radius, the pressurized water is projected from the nozzle assemblies.

According to certain embodiments, a sprinkler apparatus comprises: (a) a pop-up sprinkler head comprising a base housing configured to confiningly receive a pressurized water flow, the pressurized water flow actuating a nozzle housing coupled to the base housing to pop-up into an operating position for discharge of water through at least one nozzle assembly disposed at a top end of the nozzle housing, the at least one nozzle assembly achieving a substantially uniform spray pattern; and (b) a flow control valve assembly fluidly coupled to the pop-up sprinkler head to controllably supply the pressurized water flow, the flow control valve assembly comprising a water inlet fluidly coupled to a water supply and a water outlet fluidly coupled to the base housing of the pop-up sprinkler head, the water outlet cooperatively engaging with a rotary disc valve having a tapered passage wherein sliding rotation of the rotary disc valve incrementally adjusts the valve between an opened position and a closed position to control the pressurized water flow through the water outlet to the base housing.

According to other embodiments, a sprinkler apparatus comprises: (a) a pop-up sprinkler head comprising a base housing configured to confiningly receive a pressurized water flow, the pressurized water flow actuating a nozzle housing coupled to the base housing to pop-up into an operating position for discharge of water through at least one pair of nozzle assemblies, the at least one pair of nozzle assemblies comprising an upper nozzle assembly and a lower nozzle assembly at a top end of the nozzle housing, wherein the upper nozzle assembly responsive to the rate of pressurized water flow distends to vary the wetted radius of discharged water, and wherein the lower nozzle assembly comprises a vertical slit-shaped aperture through which water is discharged in a curtain effect, the at least one pair of nozzle assemblies together achieving a substantially uniform elliptical spray pattern; and (b) a flow control valve assembly fluidly coupled to the pop-up sprinkler head to controllably supply the pressurized water flow.

According to further embodiments, a sprinkler apparatus comprises: (a) a base housing configured to confiningly receive a pressurized water flow; (b) a nozzle housing coupled to the base housing, the nozzle housing sized to slidingly couple with the base housing to pop-up into an operating position or retract into a nested position; (c) an upper nozzle assembly positioned at a top end of the nozzle housing, the upper nozzle assembly comprising a rigid outer frame and a resilient inner nozzle positioned therein, the diameter of the inner nozzle being smaller than the rigid outer frame to provide space for the inner nozzle to distend to a maximum orifice size determined by the circumference of the outer frame, the resilient inner nozzle responsive to the rate of pressurized water flow to distend up to the maximum orifice size to vary the wetted radius of discharged water from the upper nozzle assembly; (d) a lower nozzle assembly positioned below the upper nozzle assembly at the top end of the nozzle housing, the lower nozzle assembly comprising a vertical slit-shaped aperture through which water is discharged in a curtain effect; and (e) a flow control valve assembly fluidly coupled to the base housing to controllably supply the pressurized water flow; wherein the upper and lower nozzle assemblies together achieve a substantially uniform elliptical spray pattern.

According to certain embodiments, a flow control valve assembly, comprises: (a) a valve housing having a water inlet at a base end for fluidly coupling a pressurized water supply, and a water outlet disposed at a top end of the housing through which water is delivered; and (b) a rotary disc valve situated within the valve housing which slidingly rotates in cooperative engagement with the water outlet between an opened position and a closed position to control the pressurized water flow delivered through the water outlet. According to further embodiments, the rotary disc valve comprises a tapered passage extending from the opened position to the closed position, whereby the pressurized water flow can be incrementally adjusted between the opened and closed positions by slidingly rotating the rotary disc valve relative to the water outlet. According to other embodiments, the flow control valve assembly further comprises a valve drive mechanism comprising a motor driven transmission and a drive train adapted for operatively rotating the rotary disc valve relative to the water outlet.

Another aspect of the present disclosure pertains to a pop-up sprinkler head comprising a base housing configured to confiningly receive a pressurized water flow, the pressurized water flow actuating a nozzle housing coupled to the base housing to pop-up into an operating position for discharge of water through at least one pair of nozzle assemblies, the at least one pair of nozzle assemblies comprising an upper nozzle assembly and a lower nozzle assembly at a top end of the nozzle housing, wherein the upper nozzle assembly responsive to the rate of pressurized water flow distends to vary the wetted radius of discharged water, and wherein the lower nozzle assembly comprises a vertical slit-shaped aperture through which water is discharged in a curtain effect, the at least one pair of nozzle assemblies together achieving a substantially uniform elliptical spray pattern.

Another aspect of the present disclosure pertains to a controllable sprinkler system for irrigating a water receiving area, comprising: (a) one or more sprinkler apparatus according to any one of the embodiments disclosed herein; (b) a sprinkler selection manifold in fluid communication with a water supply and configured to receive and selectively divert the water supply to any of the one or more sprinkler apparatus fluidly coupled to the sprinkler selection manifold; and (c) a programmable controller operatively coupled to the one or more sprinkler apparatus.

Another exemplary embodiment of the present disclosure pertains to a method for irrigating an irregularly shaped and/or an asymmetrically shaped water receiving area. The method generally comprises: (a) providing the sprinkler system disclosed herein; (b) determining the geometry and irrigation needs of the water receiving area; (c) selectively diverting the water supply to the one or more sprinkler apparatus suitable to the geometry and irrigation needs determined for the water receiving area; (d) positioning the orientation of each of the one or more sprinkler apparatus according to the geometry and irrigation needs determined for the water receiving area; and (e) adjusting the pressurized water flow to each of the one or more sprinkler apparatus according to the geometry and irrigation needs determined for the water receiving area. According to further embodiments, the step of adjusting in step (e) comprises optimizing each of the one or more sprinkler apparatus to create a sprinkler spray pattern that is adjusted with sprinkler sweep to correct inconsistencies in the uniformity of the spray pattern, said optimizing comprising: (a) selecting a desired target level of precipitation density for the water receiving area; (b) determining the number of sprinkler sweeps needed to achieve the selected precipitation density; (c) pairing the number of determined sprinkler sweeps with the selected precipitation density to determine the amount to pull back on each sweep; (d) determining a new flow rate based on the amount of pull back determined; and (e) generating a spray pattern that applies the pulled back flow rates at the calculated rates on each sprinkler sweep to correct the inconsistencies in the uniformity of the spray pattern.

BRIEF DESCRIPTION OF THE DRAWINGS

These and other features of the invention will become more apparent in the following detailed description in which reference is made to the appended drawings.

FIG. 1c is a perspective view of the sprinkler apparatus showing the automatic drain valve in the water inlet of the in-ground housing; FIG. 1d is a close-up side view of the drain valve, according to embodiments of the present disclosure;

FIG. 14a is a top view of the inner chamber of the flow control valve assembly shown in FIG. 12, while

DETAILED DESCRIPTION

Figure 1A:
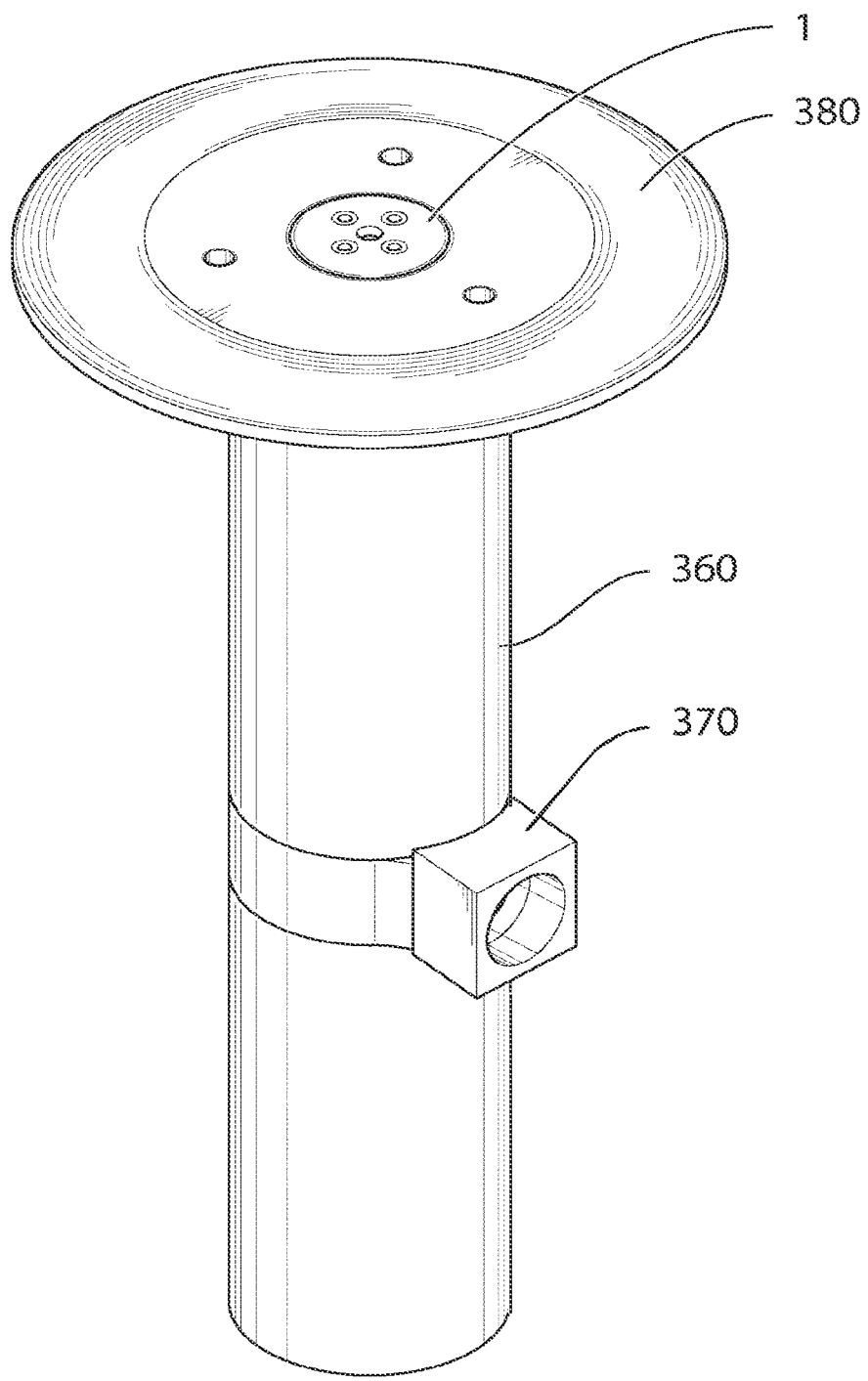
FIGS. 1a and 1b are perspective views of a sprinkler apparatus showing the pop-up sprinkler head in its nested inoperative position and in its extended operative position, respectively, housed within an in-ground housing, according to embodiments of the present disclosure.
Figure 1B:
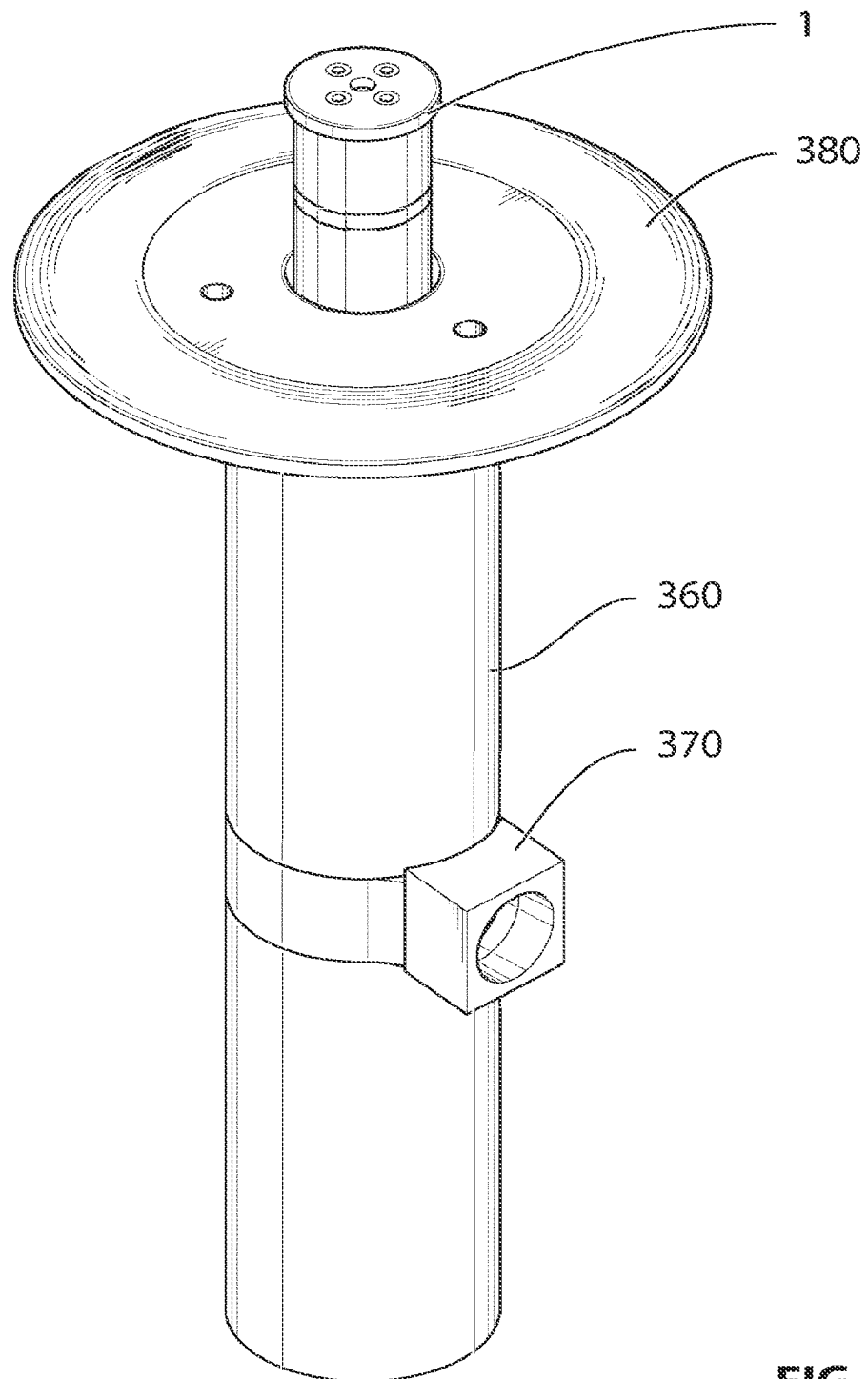
Figure 1C:
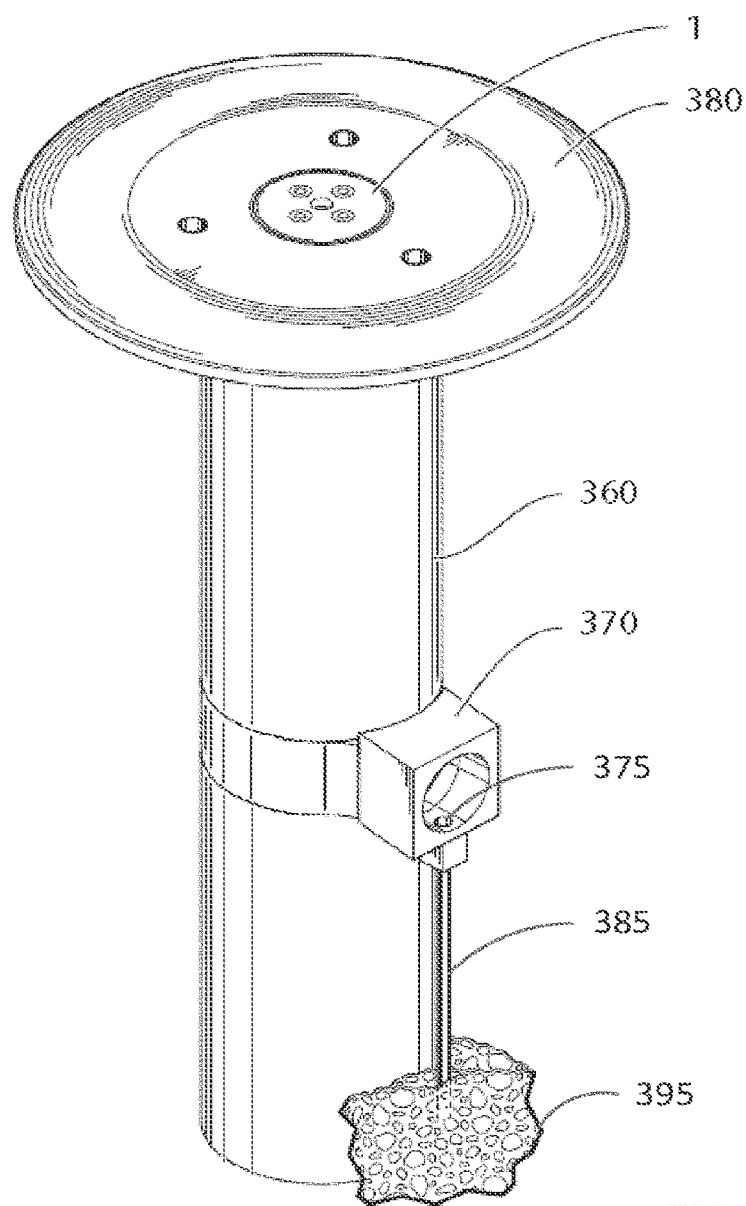
FIGS. 1c and 1d illustrate a further embodiment of a sprinkler apparatus having an automatic drain valve in the in-ground housing.

Unless defined otherwise, all technical and scientific terms used herein have the same meaning as commonly understood by one of ordinary skill in the art to which this invention belongs.

As used herein, the term "about" refers to an approximately +/−10% variation from a given value. It is to be understood that such a variation is always included in any given value provided herein, whether or not it is specifically referred to.

The term "modulate" as used herein means to precisely regulate and/or to precisely adjust a flow of water by a controlled increase or decrease in the rate of the flow.

The term "wetted radius" as used herein means the distance from a sprinkler to a point along the edge of the wetted perimeter. Wetted radius is the distance the sprinkler throws water.

The term "wetted diameter" as used herein means the diagonal distance from one side of a wetted perimeter through the point of sprinkler rotation to the opposite side of the wetted perimeter. Wetted diameter is twice the wetted radius.

The term "wetted area" as used herein means the area that becomes wetted as a sprinkler rotates. It is the area within the circle inscribed by the wetted radius.

The term "distribution uniformity" or "DU" as used herein is a calculated value that shows how evenly water is distributed in a sprinkler system to avoid excessively wet or dry areas in the landscape. High distribution uniformity is obtained when an equal amount of water is placed on all areas of the landscape.

The term "sprinkler spray pattern", "spray pattern", or "wetting pattern" as used herein means the characteristic features of the water spray being discharged from a sprinkler head, including the shape, size, and uniformity of the spray.

The term "sweep" as used herein means a single pass of the sprinkler spray from a first angle of the sprinkler's rotational pattern to the final angle over the wetted area.

The sprinkler apparatus according to the present disclosure broadly comprises a sprinkler head and a flow control valve assembly. Each of these components of the sprinkler apparatus is self-contained and, therefore, can be used independently or can be used in combination in a sprinkler apparatus, as described in exemplary embodiments herein for example. Each component is designed to comprise a minimum number of parts that can be discretely packaged as the sprinkler head and flow control valve assembly, respectively. In this way, installation, maintenance, and repair of each component and/or the sprinkler apparatus is facilitated.

The sprinkler head, according to certain embodiments, comprises a nozzle housing that is sized to slidingly couple with a base housing. The top end of the nozzle housing comprises the nozzle assemblies which are exposed to discharge water when in the operating position. The nozzle housing has a bottom end that comprises a plurality of orifices to allow passage of the pressurized water flow through the nozzle housing to discharge from the nozzle assemblies at the top end of the nozzle housing. The pressurized water flow received through the water inlet into the base housing is greater than the pressurized water flow through the nozzle housing, and discharged from the nozzle assemblies, to create a pressure differential that actuates the nozzle housing to slidingly pop-up into the operating position.

The sprinkler head component can be fitted with nozzle assemblies known in the art. According to some embodiments of the present disclosure, the sprinkler head comprises at least one nozzle assembly which provides a substantially uniform spray pattern with a bias to the outermost end of the spray. According to particular embodiments, the apparatus comprises at least one pair of cooperating nozzle assemblies which together provide a substantially uniform elliptical spray pattern with a bias to the outermost end of the spray. According to such embodiments, an upper nozzle assembly is configured to provide a long-throw spray. The upper nozzle assembly comprises a rigid outer frame and a resilient inner nozzle positioned therein. The diameter of the inner nozzle is smaller in size than the rigid outer frame to provide space for the inner nozzle to distend to a maximum orifice size that is determined by the circumference of the outer frame. According to certain embodiments, the inner nozzle has an inner diameter that tapers towards the water discharging orifice to further provide space for the inner nozzle to distend to the maximum orifice size. According to such embodiments, the inner nozzle has an inner diameter that tapers from the maximum orifice size at the water receiving end towards the water discharging orifice having a smaller diameter. The resilient inner nozzle, responsive to the rate of pressurized water flow, can distend up to the maximum orifice size and, in this way, the radial distance of water discharged, i.e., wetted radius of the discharged water, from the upper nozzle assembly can be controllably varied. A lower nozzle assembly is positioned below the upper nozzle assembly to provide a short-throw spray. In this way, the pair of nozzle assemblies cooperate to cover the radial distance from the sprinkler head in a substantially uniform spray with a bias to the outermost end of the spray. It is optional if so desired, to provide a third nozzle assembly interposed the upper nozzle assembly and the distal end of the nozzle housing, with a more resilient inner nozzle to provide an even farther throw of pressurized water.

According to certain embodiments, the wetting pattern of the spray discharged from the sprinkler head can be modified by adjusting the shape of the nozzle assembly. For example, according to such embodiments, the resilient inner nozzle in the upper nozzle assembly can be made to be biased or beveled to modify the distribution of water in the discharged spray. By beveling the nozzle, for example, the water distribution in the discharged spray can be modified from being heaviest near the sprinkler head to being heavier at the periphery of the wetted diameter, i.e., having a bias to the outermost end of the spray. In this way, the uniformity of water distributed in the spray is improved in order to maximize the watering efficiency, uniformity, and watering coverage of the wetted area. According to such embodiments, the shape of the water spray is discharged in a fan-shape. In a further embodiment, the lower nozzle assembly can comprise a vertical slit-shaped aperture through which water is discharged in a curtain effect. In this way, the nozzle assemblies cooperate to provide a substantially uniform elliptical spray pattern with a bias to the outermost end of the spray.

According to exemplary embodiments, the lower nozzle assembly comprises a vertical slit-shaped aperture through which water is discharged in a curtain effect. Together, the at least one pair of nozzle assemblies provide a substantially uniform elliptical spray pattern with a bias to the outermost end of the spray projecting outward from the pop-up sprinkler head. When the supply of pressurized water to the sprinkler apparatus is shut off, the pop-up nozzle housing slidingly retracts back into the base housing.

It will be apparent to those skilled in the art, that the flow control valve assembly, described herein, can be used in a variety of applications in which fluid flow control is desired. According to the present disclosure, the flow control valve assembly is described, without limitation, in the context of being fluidly coupled to one or more pop-up sprinkler heads to controllably supply a pressurized water flow to the one or more pop-up sprinkler heads. In general, the flow control valve assembly is self-contained in design and comprises a minimum number of parts. In this way, the flow control valve assembly described herein can easily be used independent of the sprinkler head of the present disclosure. The flow control valve assembly generally comprises a valve housing to which is sealingly coupled a water inlet about the base end of the valve housing, for sealingly engaging a supply of pressurized water. A water outlet is sealingly coupled to the other end of the valve housing. A pressurized flow of water into the valve housing from a water supply cooperatively engages a rotary disc valve within the valve housing which slidingly rotates between an opened position and a closed position to control the pressurized water flow delivered to the water outlet. According to one aspect, the rotary disc valve is a disc defining a tapered passage expanding from the closed position to a fully opened position, whereby the rate of pressurized water flow delivered to the water outlet can be incrementally adjusted between the opened and closed positions.

According to an exemplary embodiment of a sprinkler apparatus, the flow control valve assembly, in combination with a sprinkler head of the present disclosure, comprises: (a) a base housing configured to confiningly receive a pressurized water flow; (b) a nozzle housing coupled to the base housing, the nozzle housing sized to slidingly couple with the base housing to pop-up into an operating position and to retract into a nested position; (c) an upper nozzle assembly positioned at a top end i.e. distal end of the nozzle housing; and (d) a lower nozzle assembly positioned below the upper nozzle assembly at the top end of the nozzle housing; and (e) a flow control valve assembly fluidly coupled to the base housing to controllably supply the pressurized water flow; wherein the upper and lower nozzle assemblies provide a substantially uniform elliptical spray pattern with a bias to the outermost end of the spray projecting outward from the pop-up sprinkler head.

The sprinkler apparatus described herein can further be incorporated into a controllable system for irrigating a water receiving area. According to certain embodiments, the system offers multiple sprinkler apparatus to be programmably controlled to operate simultaneously and in a synchronized fashion to provide a watering pattern that is suitable to the geometry and irrigation needs for the particular water receiving area. In such embodiments, the system comprises computer instrumentation programmed to create and implement a spray pattern based on the geometry and irrigation needs for the water receiving area. According to further embodiments, the system comprises computer instrumentation programmed to create and implement a spray pattern that will compensate for inconsistencies in the uniformity of the spray pattern that is based on the nozzle profile and target precipitation density for the specific water receiving area.

Embodiments of the present disclosure will now be described by reference to FIGS. 1 to 18, which show an exemplary representation of a sprinkler apparatus and system for irrigation of the present disclosure.

A sprinkler apparatus of the present disclosure generally comprises a pop-up sprinkler head 1 and a flow control valve assembly 200 fluidly coupled to the pop-up sprinkler head 1 to controllably supply a pressurized water flow for discharge from the sprinkler head 1.

Pop-Up Sprinkler Head—Uniform Elliptical Spray

A pop-up sprinkler head 1, according to embodiments of the present disclosure is shown in FIGS. 3a, 3b, 4a, and 4b, and generally comprises a base housing 10 configured to confiningly receive a pressurized water flow at a water inlet 15 disposed along the body of the base housing 10 that is fluidly connected to a pressurized water source. A nozzle housing 20 is secured to the base housing 10 by a securing means such as a threaded collar 80. The nozzle housing 20 is sized to slidingly fit within the base housing 10 such that the nozzle housing 20 can be actuated by a pop-up mechanism to pop-up into an operating position or retract into a nested position.

Figure 3A:
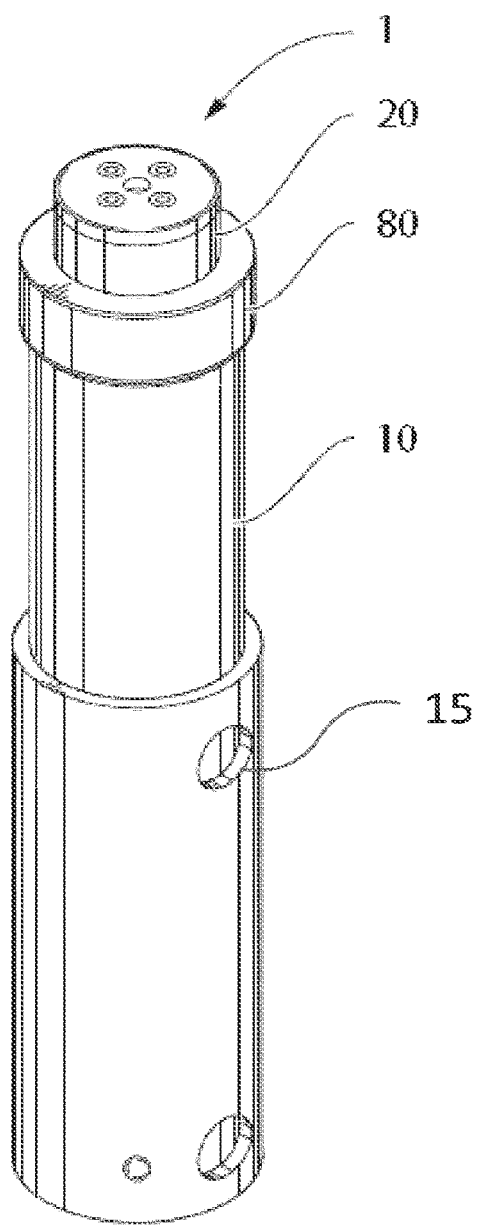
FIGS. 3a and 3b are perspective views of embodiments of the pop-up sprinkler head shown in FIG. 1, according to embodiments of the present disclosure.
Figure 3B:
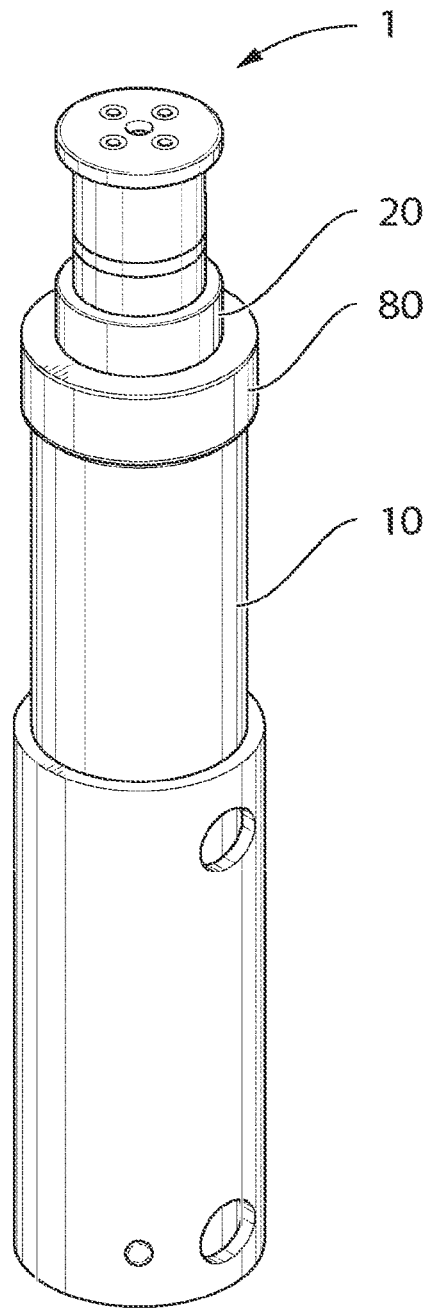
Figure 4A:
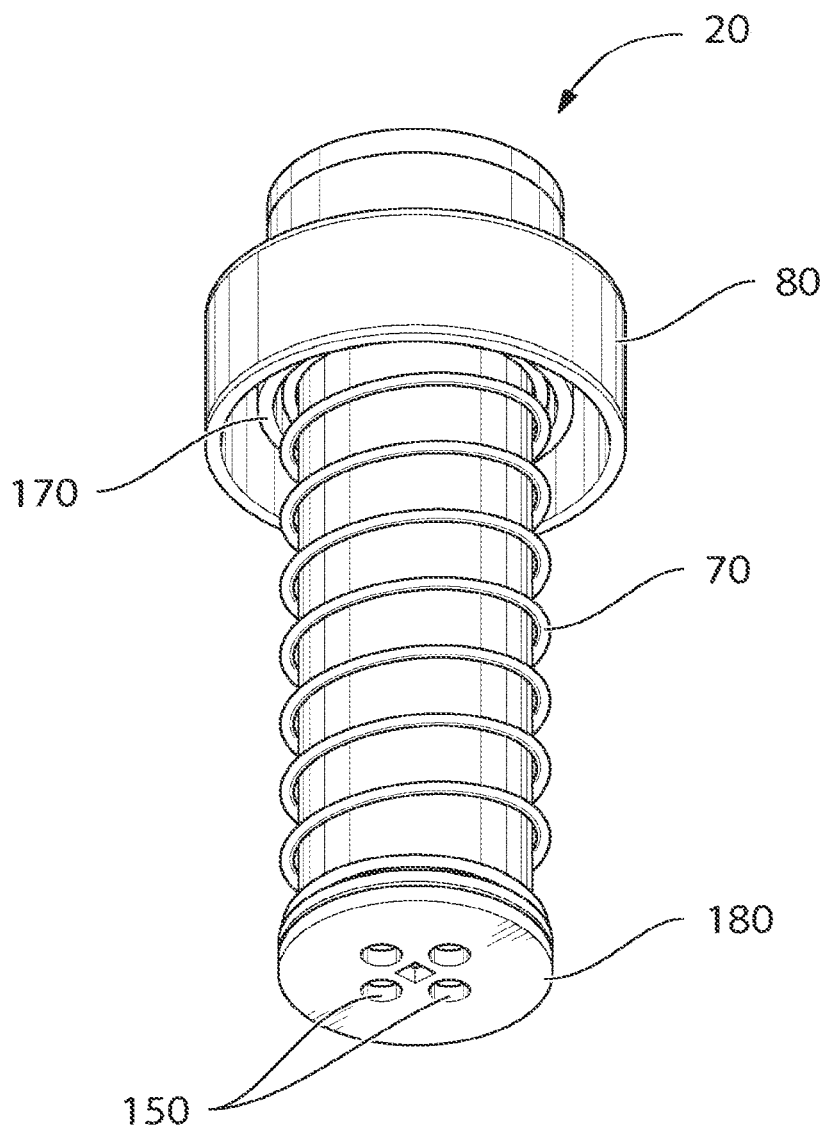
FIGS. 4a and 4b are perspective views of the retractable nozzle housing of the pop-up sprinkler head shown in FIG. 1, in a nested position and in an extended position, respectively, according to embodiments of the present disclosure.
Figure 4B:
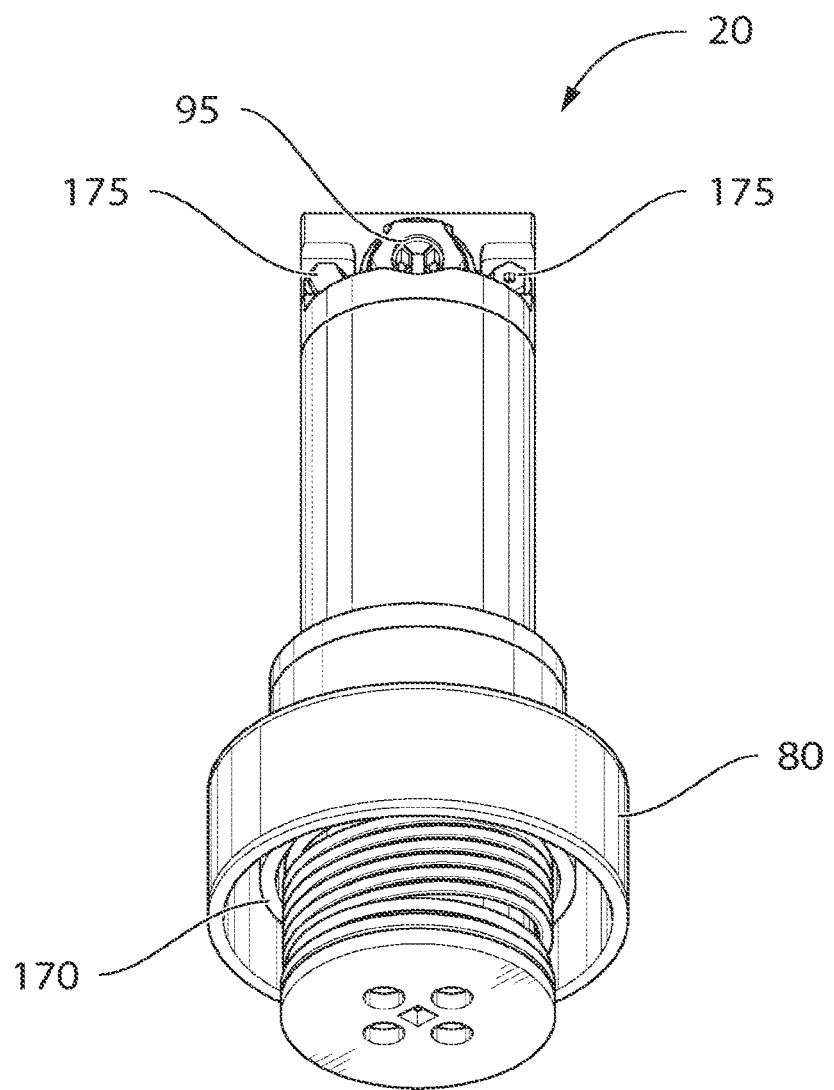

As illustrated in FIGS. 3a and 4a, when not operative, the nozzle housing 20 is normally biased in a downward, nested position, so that the nozzle housing 20 is retracted in the base housing. The nozzle housing 20 is normally biased downward by a spring 70, for example. The spring 70 operatively biases the nozzle housing 20 against pop-up movement, the nozzle housing 20 being responsive to pressurized water flow through the nozzle housing 20. Thus, when at rest, i.e., with no flow, the nozzle housing 20 remains nested within the base housing 10, as indicated in FIGS. 3a and 4a. Then, in response to pressurized water flow through the nozzle housing 20, the nozzle housing 20 rises upward into a pop-up position (FIGS. 3b and 4b). The nozzle housing 20 is lifted to rise upward out of the base housing 10 due to the greater pressure and flow of water in the base housing compared to the flow rate of the water being discharged through the nozzles.

Figure 10:
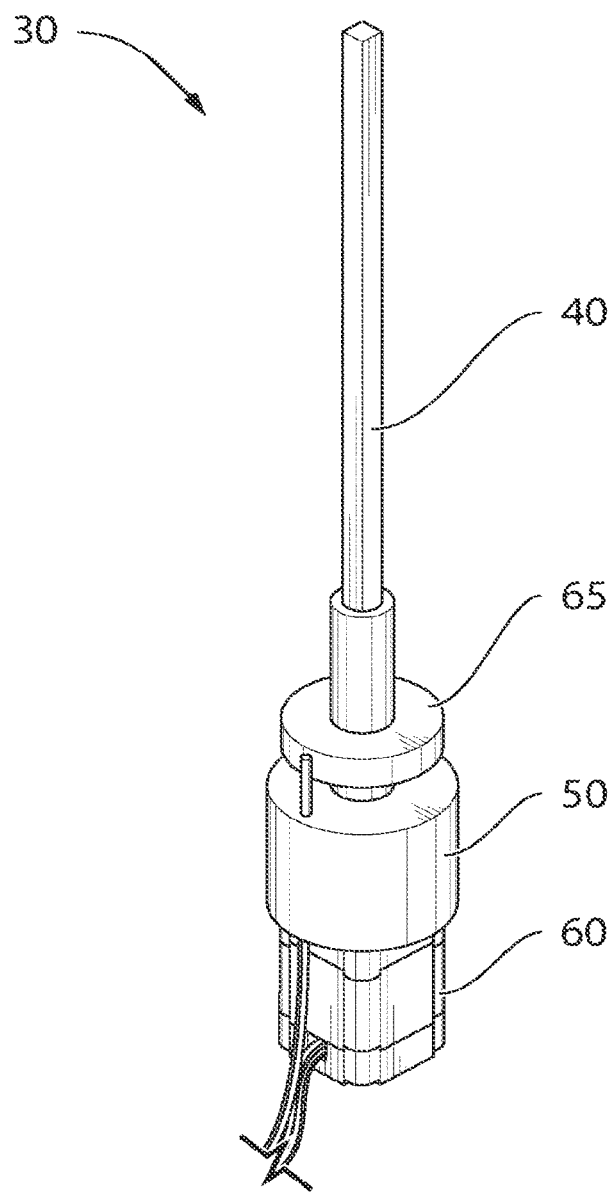
FIG. 10 is a perspective view of the drive mechanism of the pop-up sprinkler head shown in FIG. 3, according to embodiments of the present disclosure.
Figure 11:
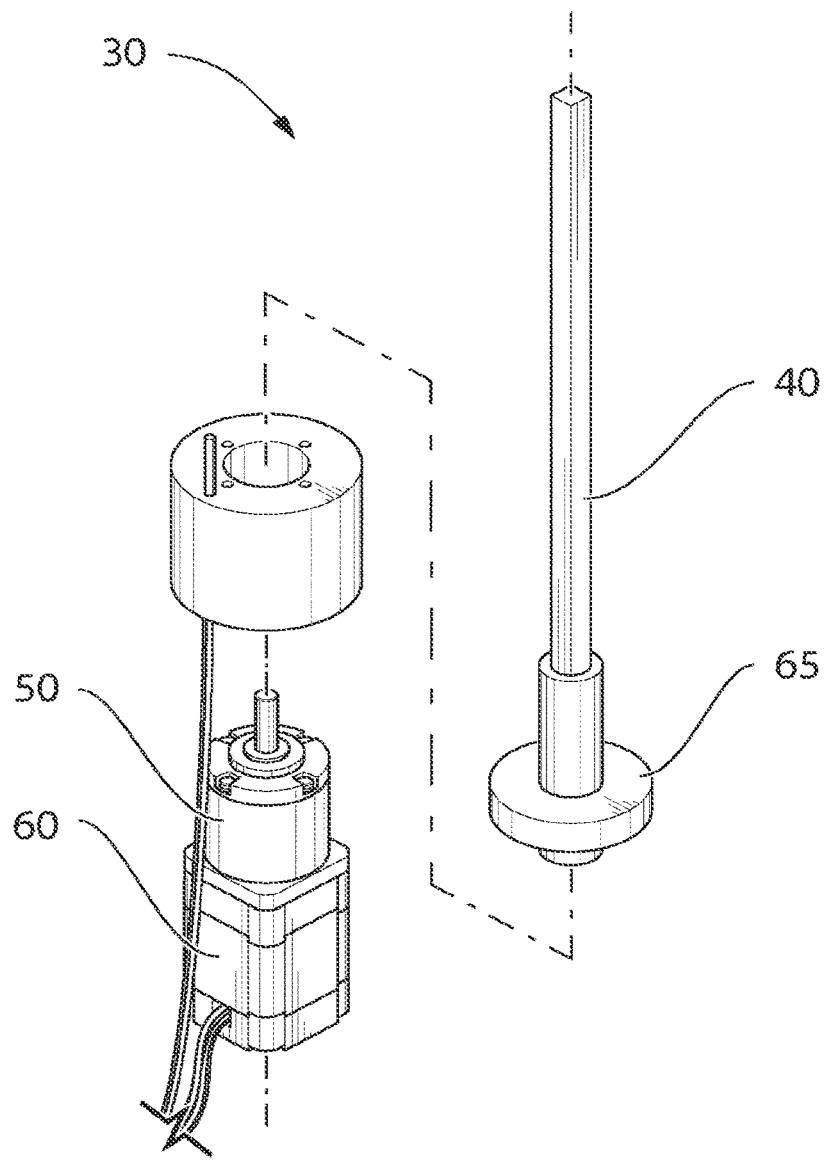
FIG. 11 is an exploded view of the drive mechanism shown in FIG. 10, according to embodiments of the present disclosure.

In one embodiment, the spring 70 may be provided as a coiled, generally helical spring around the circumference of the external body of the nozzle housing 20. The nozzle housing 20 has a nested position within the base housing 10 wherein the spring 70, urged against the threaded collar 80, biases the nozzle housing 20 downward against pop-up movement. The position of the nozzle housing 20 can be detected according to certain embodiments. As shown in FIGS. 10 and 11, for example, an embedded magnet (not shown) 65 in cooperation with a sensor 50, in communication with a microprocessor, is located on the drive mechanism 30 contained within the inner chamber 25 of the base housing 10. According to certain embodiments, the magnet can be sized to be embedded within the drive mechanism. For example and without limiting the foregoing, the magnet can have a diameter of 0.250" and a thickness of 0.125" so as to be embedded within 65 of the drive mechanism 30. In this way, a "home positioning" signal can be detected when the nozzle housing 20 is in its nested position and in contact with the magnet 65. Similarly, the nozzle housing 20 has a pop-up operating position wherein the pressurized water flow through the nozzle housing 20 actuates the nozzle housing 20 to move upward to an operating position against an upper end stop 170, as indicated in FIGS. 4a and 4b. The upper end stop 170 can comprise a seal to prevent water leakage between the base housing 10 and nozzle housing 20 which could otherwise reduce the pressurized water flow being applied.

Figure 7:
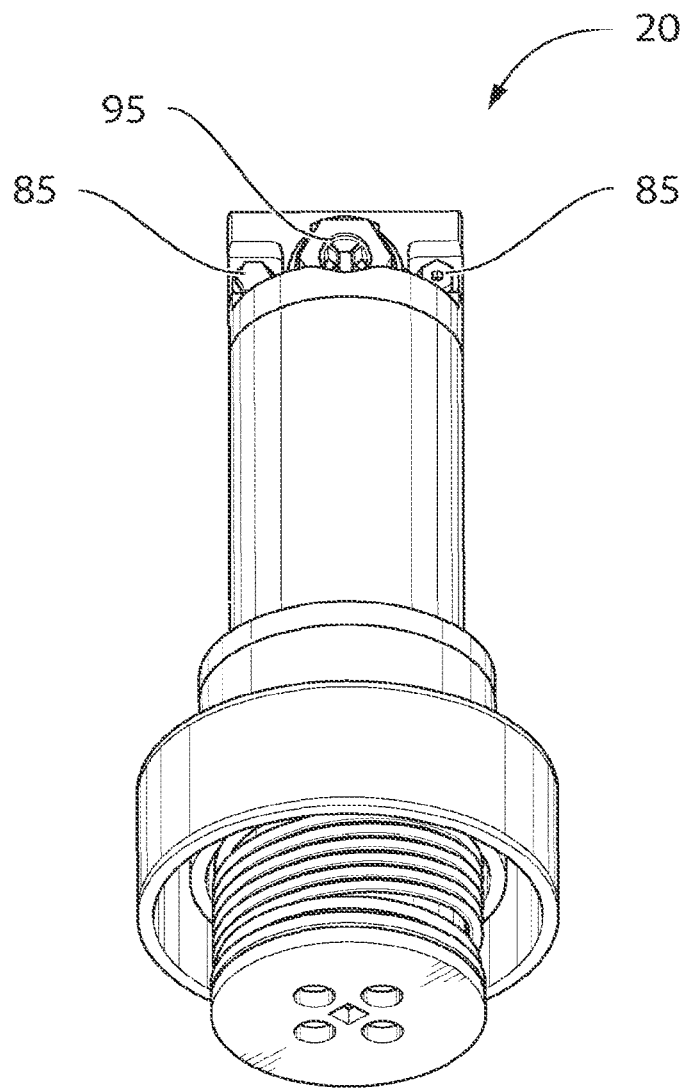
FIG. 7 is a perspective view of a nozzle housing having three interchangeable nozzle assemblies, according to embodiments of the present disclosure.

Referring to FIG. 4a, the bottom surface 180 of the nozzle housing 20 further comprises a plurality of orifices 150 to allow passage of the pressurized water to flow into the nozzle housing 20 to ultimately discharge through at least one nozzle assembly positioned at the top end of the nozzle housing 20. According to certain embodiments, as shown in FIG. 7, the nozzle housing 20 can comprise a plurality of nozzle assemblies at a top end of the nozzle housing 20. The nozzle housing, according to embodiments, can comprise one, or more than one nozzle assembly 95 arranged at the top end of the nozzle housing 20. According to some embodiments, the nozzle housing comprises up to five nozzle assemblies arranged at the top end of the nozzle housing 20. According to further embodiments, the nozzle assemblies are linearly arranged about the top end of the nozzle housing 20. According to particular embodiments, the nozzle assemblies can be interchangeable to allow the spray pattern to be adjusted as needed. Individual nozzle assemblies 95 can be interchangeably connected to the nozzle housing by any connection means known in the art. For example, according to some embodiments, the nozzle assemblies can be interchangeably connected to the nozzle housing by screw-type connectors 175 disposed at the top end of the nozzle housing (FIG. 8), or according to alternative embodiments for example can be slideably connected to the nozzle housing.

Figure 8:
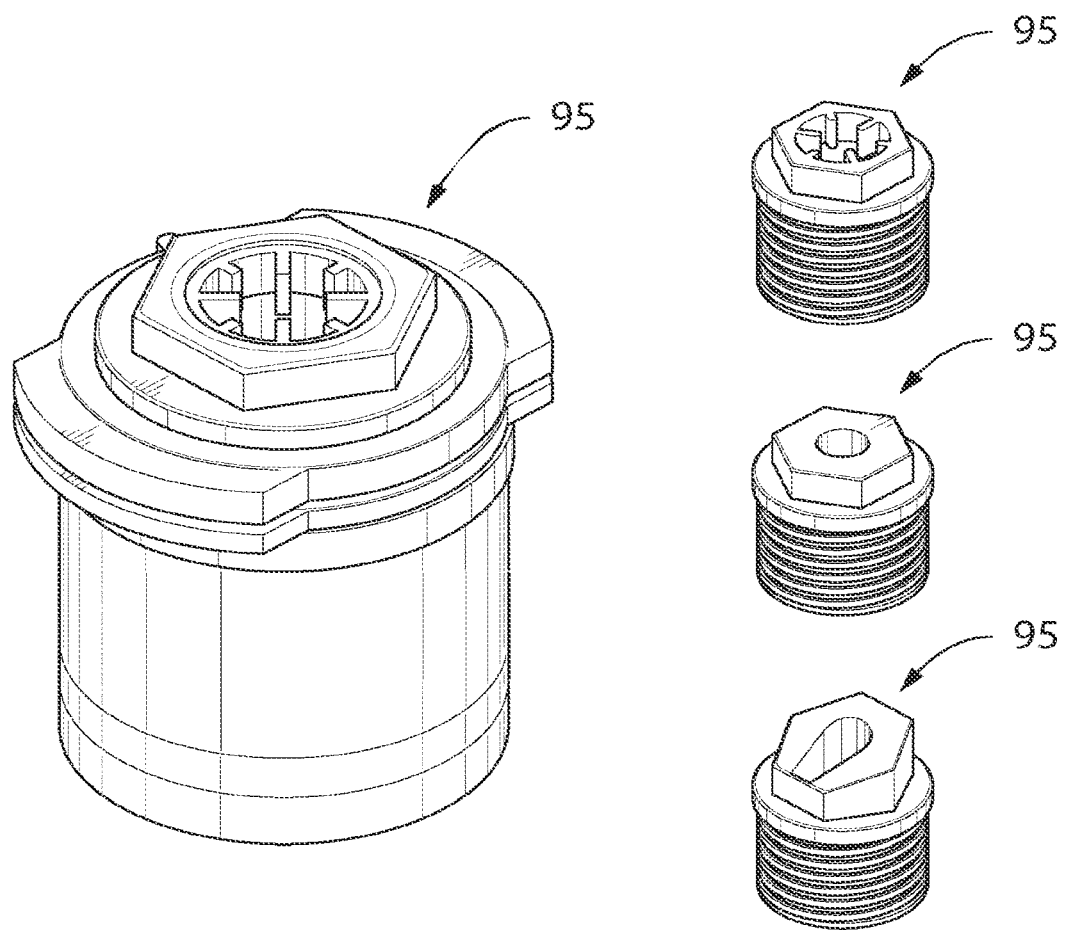
FIG. 8 is a perspective view of the interchangeable nozzle assemblies shown in FIG. 7, according to embodiments of the present disclosure.

The sprinkler head 1 of the present disclosure can be adapted to work with a variety of nozzle assemblies known in the art, examples of which are shown in FIG. 8, and include without limitation such commercial nozzles provided by Hunter Industries (PGB, PGB Ultra, I 20, ST System Rotors), Toro Company (Mini 8, T5, Super 800, TR5OXT, T7, TR7OXTP), and Rain Bird Corporation (3500, 5000/5000 Plus).

Figure 5:
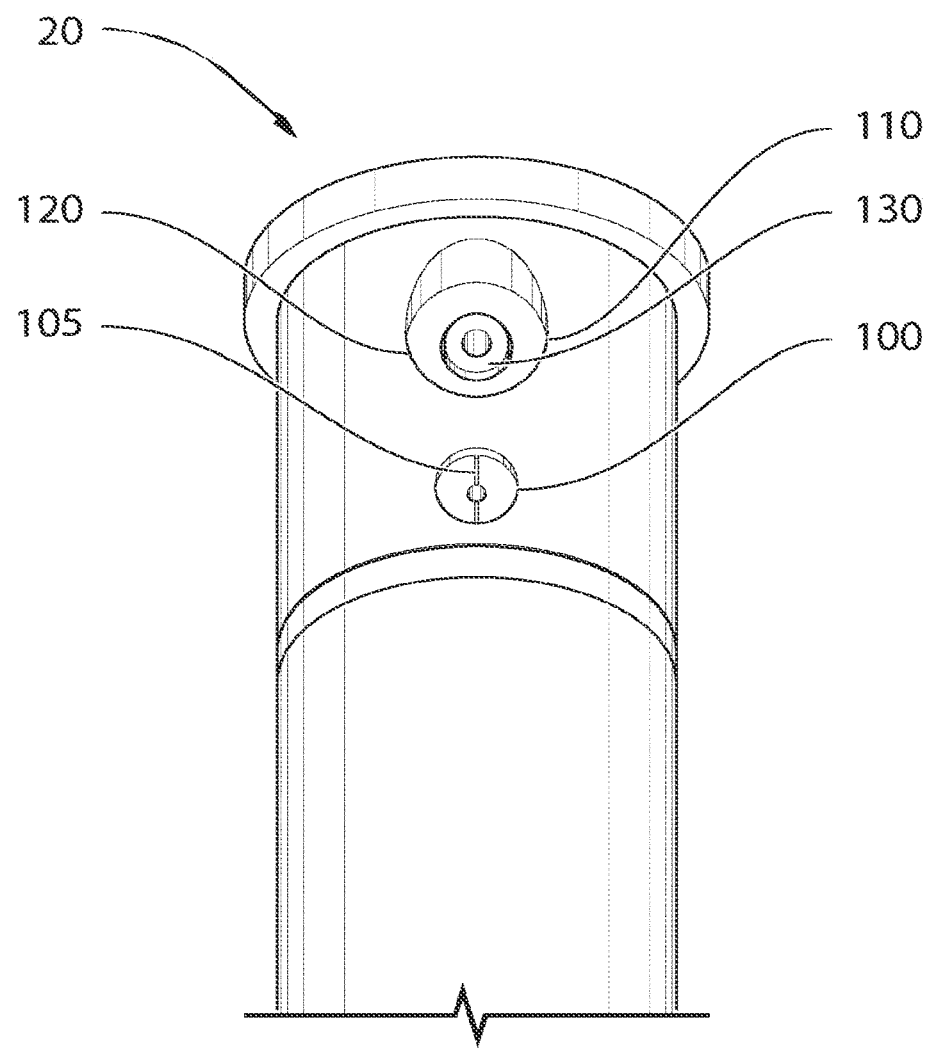
FIG. 5 is a perspective view of a nozzle housing having an upper distending nozzle assembly and a lower slit nozzle assembly, according to embodiments of the present disclosure.

According to certain embodiments, however, as shown in FIG. 5, the nozzle housing 20 can comprise at least one pair of nozzle assemblies having, an upper nozzle 20 assembly 110 positioned at a top end of the nozzle housing 20 below which is positioned a lower nozzle assembly 100. According to certain embodiments, the pair of nozzle assemblies 100, 110 cooperate to provide a substantially uniform elliptical spray pattern with a water distribution that is biased to the outermost end of the spray.

The upper nozzle assembly 110 is configured to provide a long-throw spray. According to certain embodiments, the upper nozzle assembly 110 is configured to provide a wetted radius ranging from about 6 feet to about 125 feet. According to other embodiments, the upper nozzle assembly 110 is configured to provide a wetted radius ranging from about 10 feet to about 20 feet. In further embodiments, the upper nozzle assembly 110 is configured to provide a wetted radius ranging from about 20 feet to 30 about 45 feet. According to further embodiments, the upper nozzle assembly 110 is configured to provide a wetted radius ranging from about 30 feet to about 80 feet. According to other embodiments, the upper nozzle assembly 110 is configured to provide a wetted radius ranging from about 50 feet to about 90 feet.

Figure 6A:
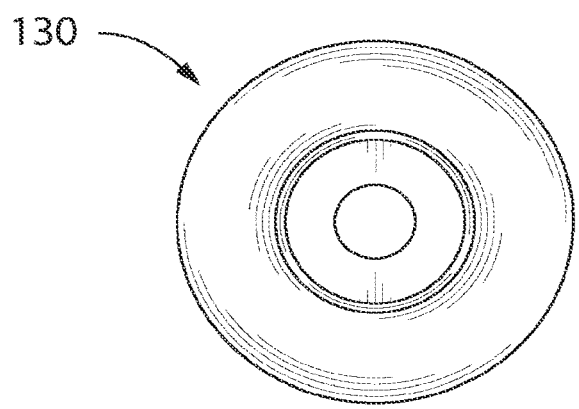
FIGS. 6a and 6b are top views and perspective side views, respectively, of the distending nozzle assembly shown in FIG. 5, according to embodiments of the present disclosure.
Figure 6B:
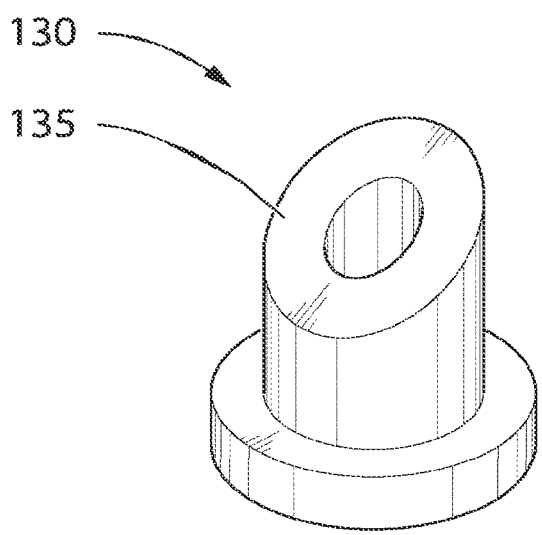

As shown in FIGS. 5, 6a and 6b, the upper nozzle assembly 110 comprises a rigid outer frame 120 and a resilient inner nozzle 130 positioned therein. The diameter of the inner nozzle 130 is smaller in size than the rigid outer frame 120 and, according to certain embodiments, has a tapered inner diameter ranging from the maximum orifice size at the water receiving end to a smaller orifice size at the water discharge end, to provide space for the inner nozzle 130 to distend to a maximum orifice size that is determined by the circumference of the outer frame 120. The resilient inner nozzle 130, responsive to the rate of pressurized water flow, can distend up to the maximum orifice size and, in this way, the wetted radius of water discharged from the upper nozzle assembly 110 can be controllably varied. According to certain embodiments the rigid outer frame 120 and the resilient inner nozzle 130 are configured to provide a 0.75", and anywhere therebetween. The resilient inner nozzle 130 can comprise any inert material known in the art having good wear resistance while providing sufficient deformability to allow the inner nozzle 130 to respond to the pressurized water flow and to distend. For example, silicone rubber, urethane rubber, and the like, may be considered suitable materials.

As is understood by those skilled in the art, the wetting pattern from a rotary sprinkler is not very uniform. According to some embodiments described herein, distribution of the water in the discharged spray can be modified by adjusting the shape of the resilient inner nozzle 130. By modifying the distribution of water in the spray, the wetting pattern can be adjusted in order to be more uniform. According to such embodiments, as shown in FIGS. 6a and 6b, the resilient inner nozzle 130 in the upper nozzle assembly 110 can be biased or beveled 135 to change the distribution of the water in the discharged spray. In such embodiments, the discharged water spray is heavier ended with more water being thrown further out from the sprinkler than close to the sprinkler. According to such embodiments, the distribution of the discharged water in the spray can be adjusted to be more evenly distributed throughout the discharged spray and, according to certain embodiments, cause water to be discharged in a fan-shape.

According to further embodiments, the lower nozzle assembly 100 can be configured to provide a short-throw spray. According to certain embodiments, the lower nozzle assembly 100 is configured to provide a wetting radius ranging up to about 6 feet. In other embodiments, the lower nozzle assembly 100 is configured to provide a wetting radius ranging up to about 10 feet. In further embodiments, the lower nozzle assembly 100 is configured to provide a wetting radius ranging up to about 20 feet. In a further embodiment, as shown in FIG. 5, the lower nozzle assembly 100 can comprise a vertical slit-shaped aperture 105 through which water is discharged in a curtain effect. In combination, the upper and lower nozzle assemblies 100, 110 cooperate to provide a substantially uniform elliptical spray pattern to cover the wetting radius in a substantially uniform spray pattern with a bias to the outermost end of the spray.

Figure 2:
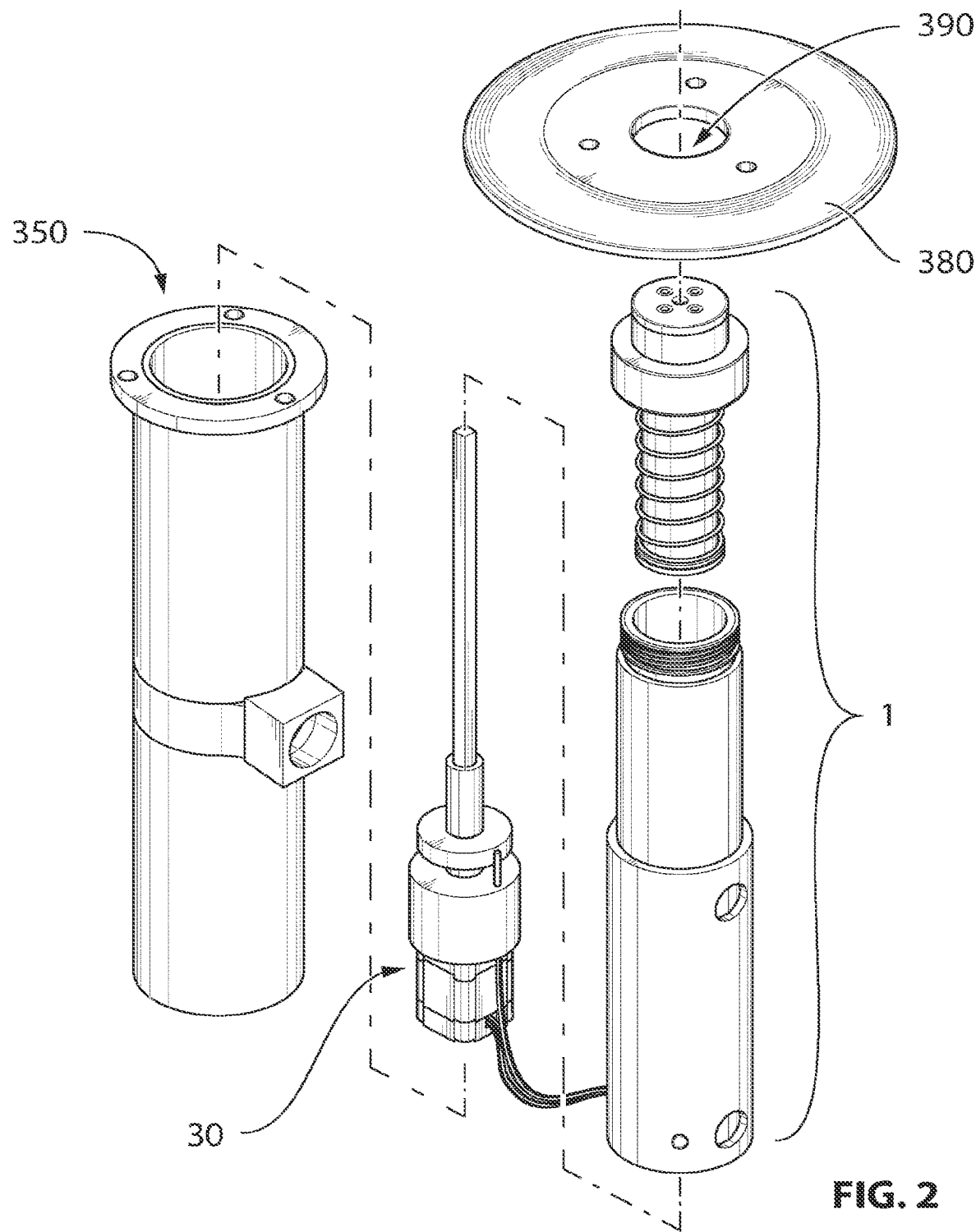
FIG. 2 is an exploded view of the sprinkler apparatus shown in FIG. 1, according to embodiments of the present disclosure.
Figure 9:
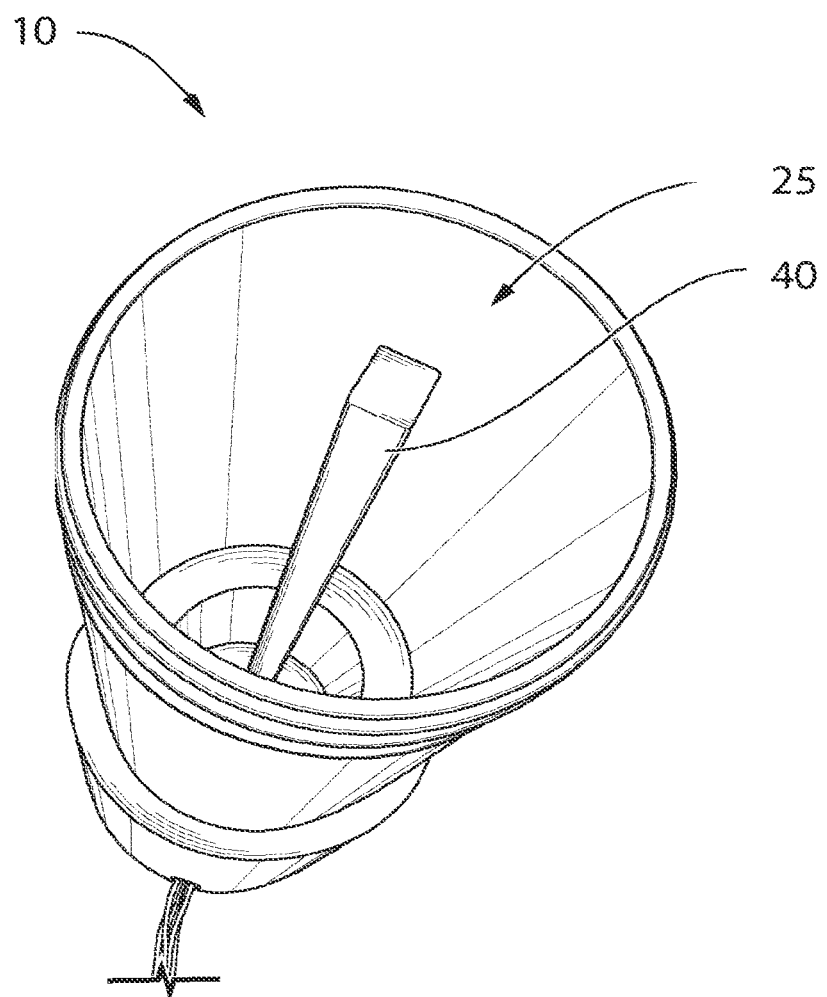
FIG. 9 is a perspective view of the inner chamber of the base housing of the pop-up sprinkler head shown in FIG. 3 with a drive mechanism installed, according to embodiments of the present disclosure.

In one embodiment, the sprinkler head 1 comprises a drive mechanism 30 that is contained within the base housing 10 (FIGS. 2, 10, and 11). The drive mechanism 30 comprises a motor 60 that drives rotation of a motor shaft 60 coupled to a transmission shaft 40 which in turn drives rotation of the nozzle housing 20 relative to the base housing 10 (FIGS. 2 and 9). According to certain embodiments, the sprinkler head 1 includes a controller (not shown) that is contained within the base housing 10 to control the motor 60 of the drive mechanism 30 and the rotation of the nozzle housing 20. In a further embodiment, the sprinkler head 1 includes a sensor 50 and a magnet 65 that detects the rotational orientation of the nozzle housing 20 relative to the base housing 10. The controller can be configured to receive and process control signals from a system controller located remotely from the sprinkler apparatus. The control signals received from the system controller may be provided either through a wired connection or wirelessly in accordance with conventional techniques. In further embodiments, the controller is programmable. Exemplary forms for the controller include a microprocessor, a programmable logic circuit (or "PLC"), an analog control circuit, and electronic components (e.g., transistors, resistors, diodes, etc.) on a circuit board.

As shown in FIGS. 9, 10, and 11, the drive mechanism 30 fits within the base housing 10 within which the electronics of the drive mechanism 30 can be housed.

In-Ground Housing—Installation and Maintenance

The self-contained nature of the pop-up sprinkler head 1 allows it to be directly installed in-ground for use in a water receiving area. Optionally, according to some embodiments, an in-ground housing 350 of the type illustrated in FIGS. 1a to 1c, and 2, can first be installed in the desired location in a water receiving area and a pop-up sprinkler head 1, as disclosed herein, inserted therein. According to such embodiments, the in-ground housing 350 alone is implanted at designated areas of a water receiving area in the pattern determined to meet the watering needs of the area. In this way, a pop-up sprinkler head 1 can then be easily inserted, accessed, and/or removed from each in-ground housing 350 without the need for complicated digging, piping, or power connection/reconnection of a system. Installation and maintenance of the system is thereby facilitated through a top access way of the in-ground housing 350.

An in-ground housing 350, as described herein, is configured to receive and house the pop-up sprinkler head 1. According to embodiments, the in-ground housing 350 comprises a tubular body 360 having a water inlet 370 disposed along the body 360 for supplying water to the pop-up sprinkler head 1 housed within. The in-ground housing 350 further comprises a removable lid or cover 380 that encloses the housing 350 with the exception of an opening 390 that is sized to allow the pop-up sprinkler head 1 to pop-up therethrough when in an operating position. According to some embodiments, the lid or cover 380 is designed to be flush with the surrounding ground so as not to interfere with the aesthetics of the landscape and to avoid interfering with the consistency of the terrain. The in-ground housing 350 can further include a power connection means (not shown) disposed at a bottom end of the tubular body 360 to allow power connection for the pop-up sprinkler head 1 housed within.

Figure 1D:
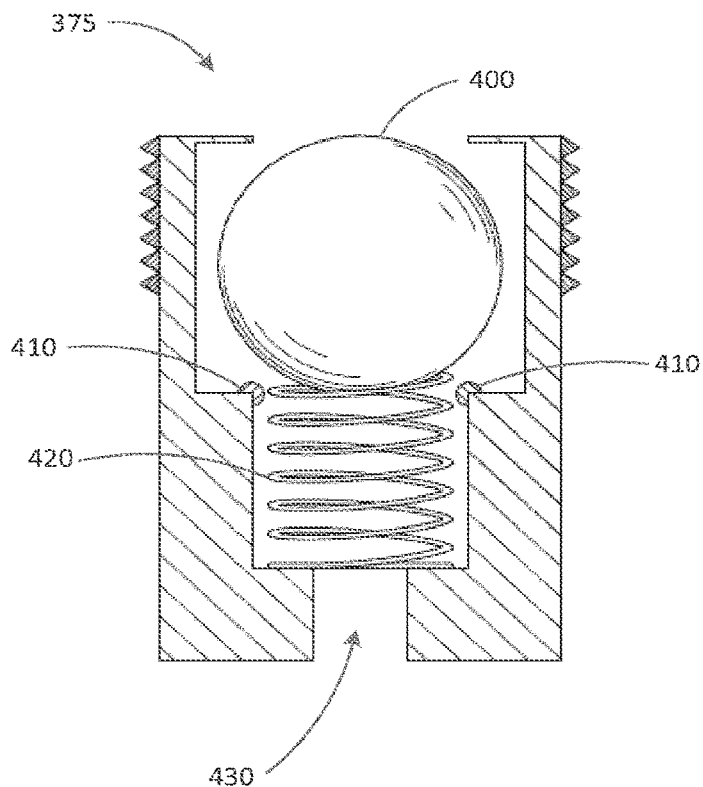

According to certain embodiments (FIG. 1c), the in-ground housing 350 can be self-draining to prevent water from collecting in the housing 350 when the sprinkler system is not in use. Such a feature is particularly useful for avoiding damage that can occur if water is allowed to collect in the housing 350 and freeze, for example. According to such embodiments, the interior of the water inlet 370 can be sloped to direct water contained within the housing 350 to an automatic drain valve 375 located within the water inlet 370. Water is then directed through the valve 375 and into a fluidly connected drain tube 385 thereby emptying the housing 350. The housing 350 can thereby be drained and the water emptied to the exterior of the housing 350 for example into a gravel reserve 395. A wide range of valves can be adapted for use within the housing 350. For example, as shown in FIG. 1d, the drain valve 375 according to one embodiment can operate by way of a spring-biased ball bearing 400. In an unpressurized state the spring 420 will bias the ball bearing 400 off the sealing surface 410 and allow the water to drain out. As soon as the system is pressurized the force of the water will be greater than the spring force and the ball bearing 400 will be pushed against the sealing surface 410 to plug the drain and prevent drainage from occuring. Other known valves may be used for this self-draining feature, for example, a flapper valve made from a flexible material, an electrical solenoid valve, etc.

Flow Control Valve Assembly—Incrementally Controllable Water Flow

Figure 12:
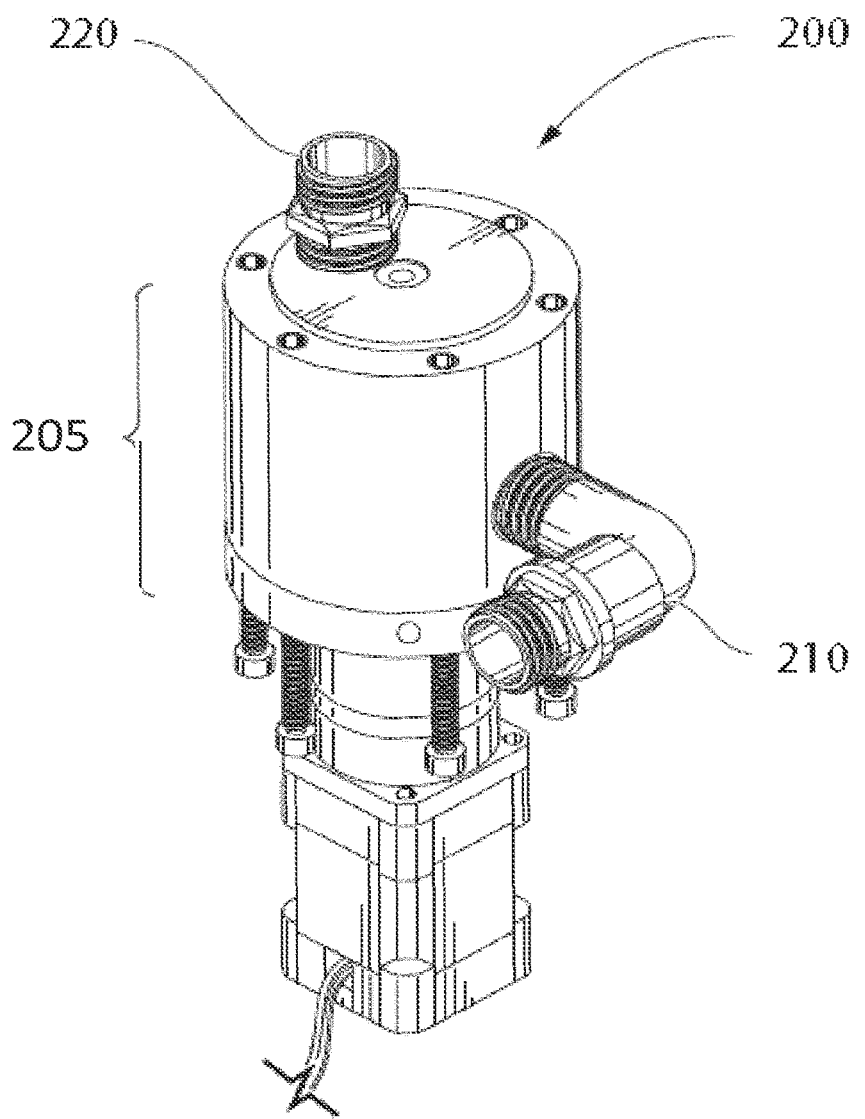
FIG. 12 is a perspective view of a flow control valve assembly, according to embodiments of the present disclosure.
Figure 13:
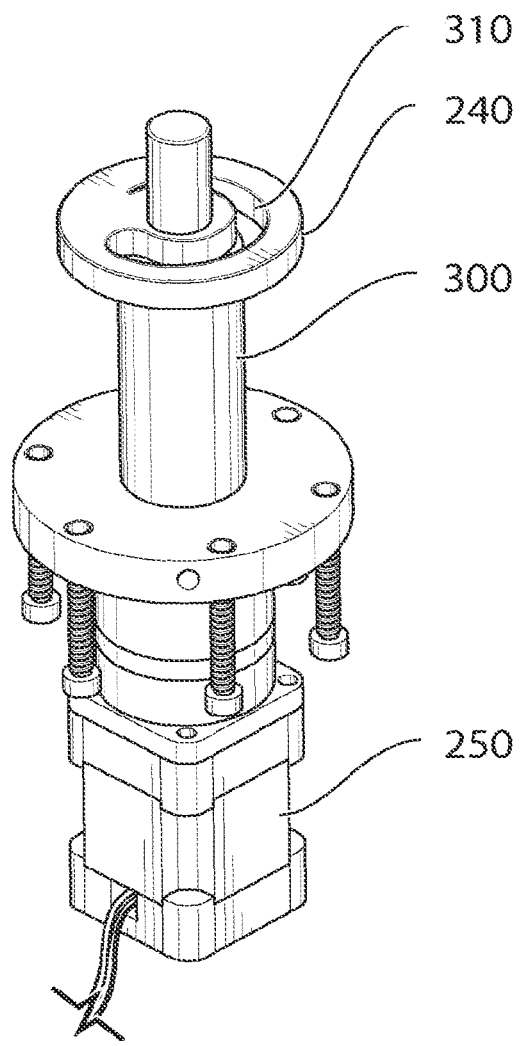
FIG. 13 is a perspective view of the valve assembly having a rotary disc valve, according to embodiments of the present disclosure.

Referring to FIG. 12, the sprinkler apparatus described herein can further include a flow control valve assembly 200 fluidly coupled to one or more of the present pop-up type sprinkler heads 1 disclosed herein, to controllably and continuously modulate the rate of flow of a pressurized water supply to be discharged through the nozzle assemblies in the sprinkler head 1. The flow control valve assembly 200 generally comprises a housing 205 defining an inner chamber. The housing 205 has an outlet 220 offset at the top end of the housing 205. A supply of pressurized water is received through an inlet 210 disposed along the body of the housing 205 through which water enters the inner chamber of the assembly 200 and eventually out through the outlet 220 of the inner chamber. A circular disc 240 slidably, sealingly, and rotationally cooperates with the housing 205 to completely block the outlet 220, alternatively to partially block the outlet 220, alternatively to completely expose the outlet 220. The circular disc 240 defines a conical aperture 310 extending in an arc around the centre of the disc 240 wherein the aperture 310 extends and tapers outward from a starting point and terminates with a circular arc. Accordingly, the solid portion of the circular disc 240 between the starting point of the aperture 310 and the arc defining the other end of the aperture 310, will completely block the outlet 220 and prevent the supply of pressurized water from flowing out of the inner chamber, effectively shutting off the flow of pressurized water. The arc defining the other end of the aperture 310 will completely open the outlet 220 and therefore, will not hinder the flow of pressurized water into, through, and out of the flow control valve assembly 200. Precisely controlling the rotation of the circular disc 240 from completely blocking the outlet 220 to completely opening the outlet 220 will increasingly allow an increasing rate of flow of pressurized water through the inner chamber, and out from the flow control valve assembly 200. Accordingly, precisely controlling the rotation of the circular disc 240 from completely opening the outlet 220 to completely blocking the outlet 220 will decreasingly reduce the rate of flow of pressurized water through the inner chamber, and out from the flow control valve assembly 200.

Figure 14A:
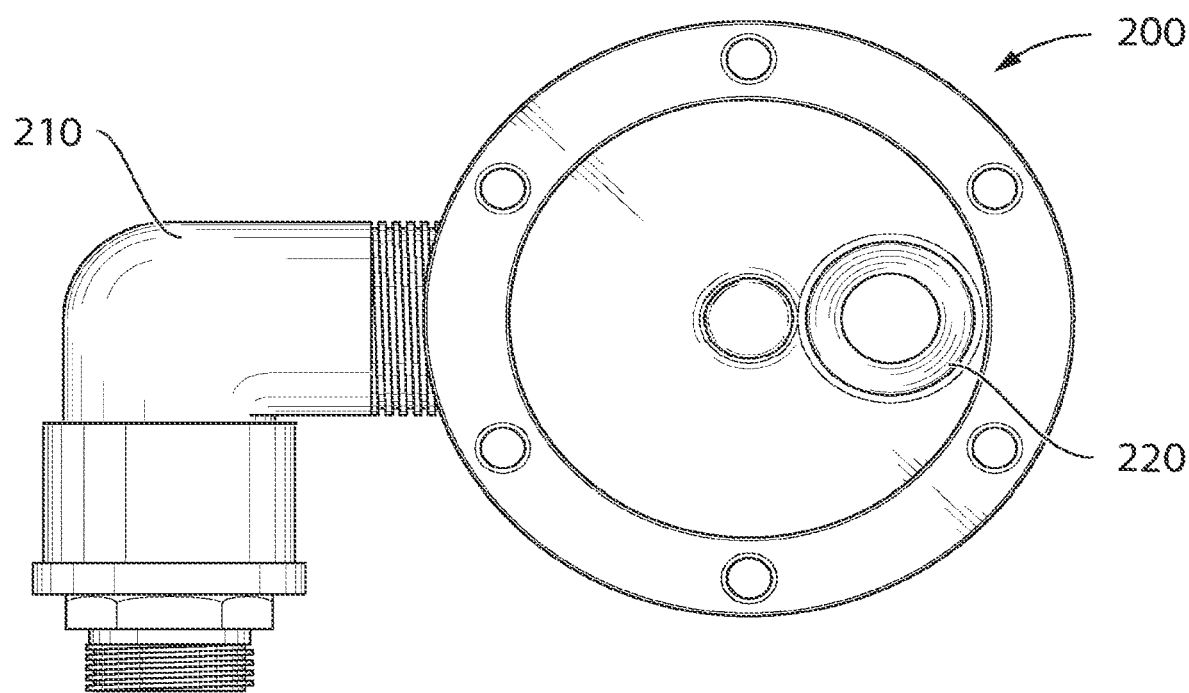
Figure 14B:
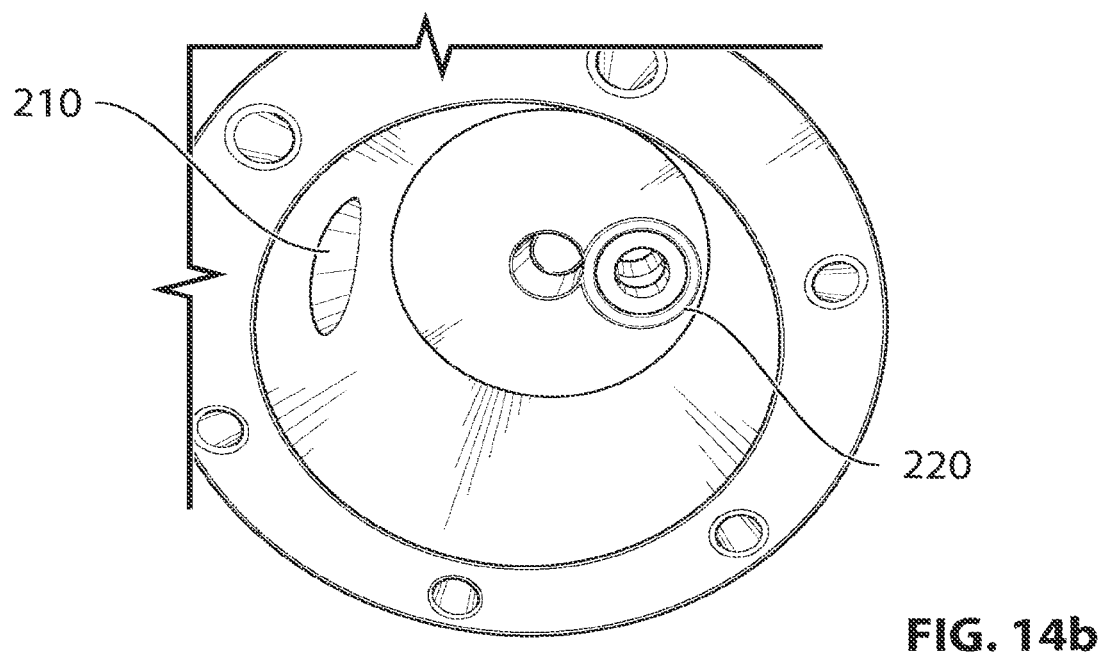
FIG. 14b is a close-up view of the inner chamber shown in FIG. 14a illustrating the water inlet and outlet, according to embodiments of the present disclosure.
Figure 15:
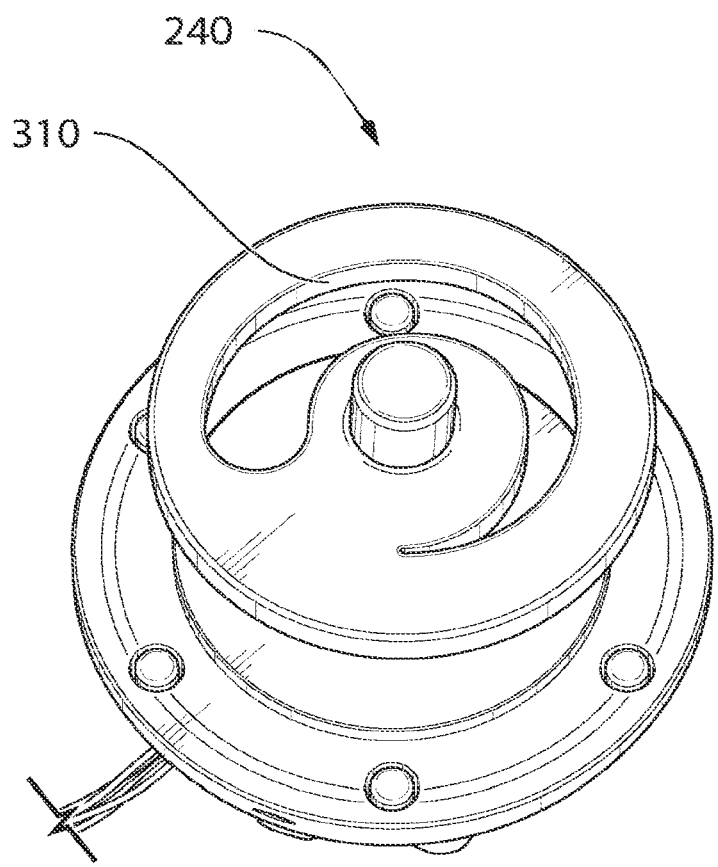
FIG. 15 is a top perspective view of the rotary disc valve assembly shown in FIG. 13, according to embodiments of the present disclosure.

In operation in the context of a sprinkler apparatus, the flow control valve assembly 200 is fluidly coupled at its water inlet 210 to a main water supply. Water entering the flow control valve assembly 200 through the inlet 210 flows via a water outlet 220 fluidly coupled to one or more sprinkler head 1 (FIGS. 14A and 14B). The circular disc 240 cooperatively engages with the water outlet 220 creating a rotary disc valve which slidingly rotates between an opened position and a closed position to control the pressurized water flow through the water outlet 220. Specifically, the tapered aperture 310 in the circular disc 240, allows the rotary disc valve to be incrementally adjusted by rotation between the opened and closed positions thereby controlling the flow of water therethrough.

The flow control valve assembly 200 can further include a valve drive mechanism 300 to operatively rotate the circular disc 240 relative to the water outlet 220 to control the flow of water through the rotary disc valve. According to such embodiments, flow control valve assembly 200 includes a controller to control the valve drive mechanism 300 and the rotation of the circular disc 240 relative to the water outlet 220. In a further embodiment the flow control valve assembly 200 can include a sensor that detects the circular disc 240 position as a "home position" with respect to the determined watering needs of the water receiving area. The circular disc 240 is then controllably rotated in "steps" around the housing axis to controllably deliver the flow of pressurized water. The controller can be configured to receive and process control signals from a system controller located remotely from the sprinkler apparatus. The control signals received from the system controller may be provided either through a wired connection or wirelessly in accordance with conventional techniques. In further embodiments, the controller is programmable. Exemplary forms for the controller include a microprocessor, a programmable logic circuit (or "PLC"), an analog control circuit, and electronic components (e.g., transistors, resistors, diodes, etc.) on a circuit board. The controller controls the motor 250 of the valve drive mechanism 300 and the rotational positioning of the circular disc 240 relative to the water outlet 220. In this way, the flow control valve assembly 200 operates in response to signals from a controller to control flow of water from the main water supply to the sprinkler head 1.

Sprinkler System—Environment-Responsive Irrigation System

According to certain embodiments, a sprinkler system having one or more sprinkler apparatus of the present disclosure is described. In such embodiments, the one or more sprinkler apparatus can be synchronously controlled by a controller in order to provide programmable irrigation that is specific to the geometry and watering needs of a particular water receiving area. A typical application of this embodiment is an in-ground sprinkler system, such that the one or more sprinkler apparatus are located in constant, fixed positions, and each sprinkler apparatus is under programmed control to provide uniform watering that is designed for the particular environment and conditions of the water receiving area.

Figure 16:
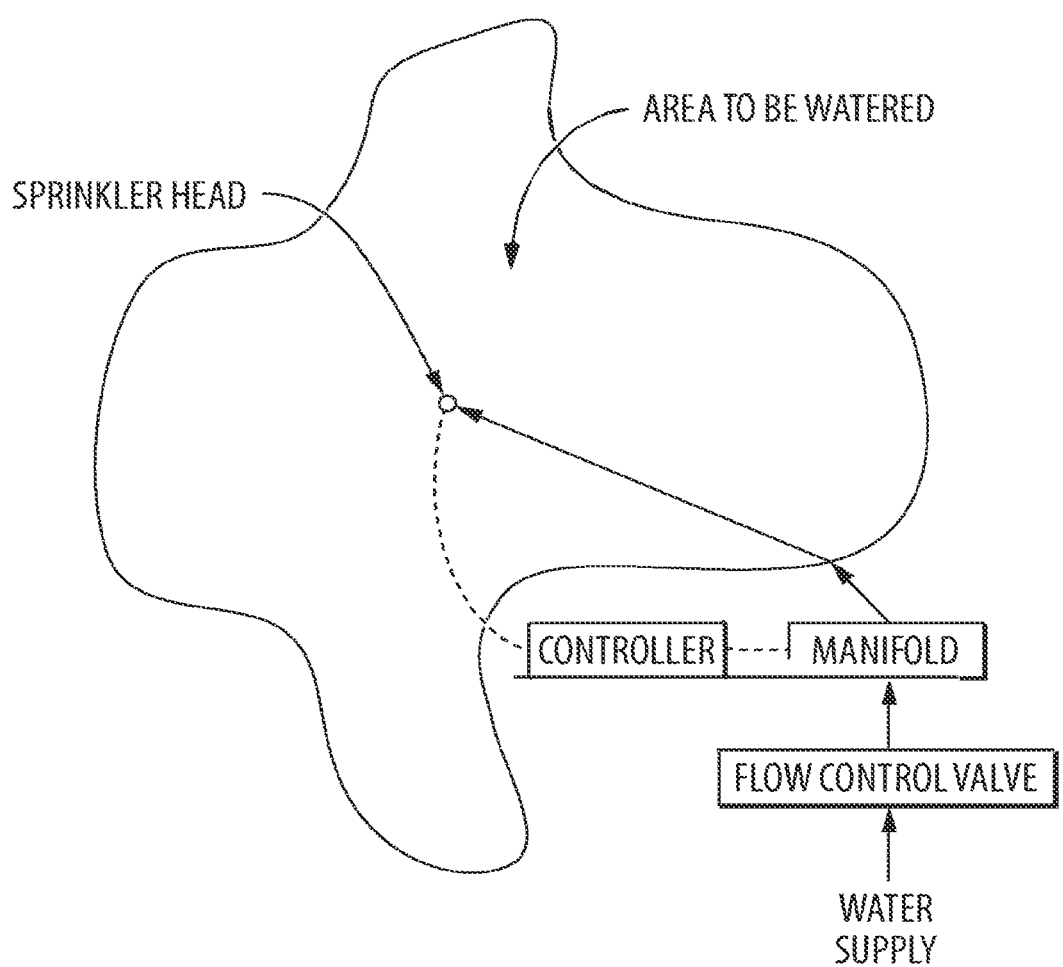
FIG. 16 is a plan view diagram depicting a sprinkler system for irrigating an irregularly-shaped water receiving area, according to embodiments of the present disclosure.
Figure 17:
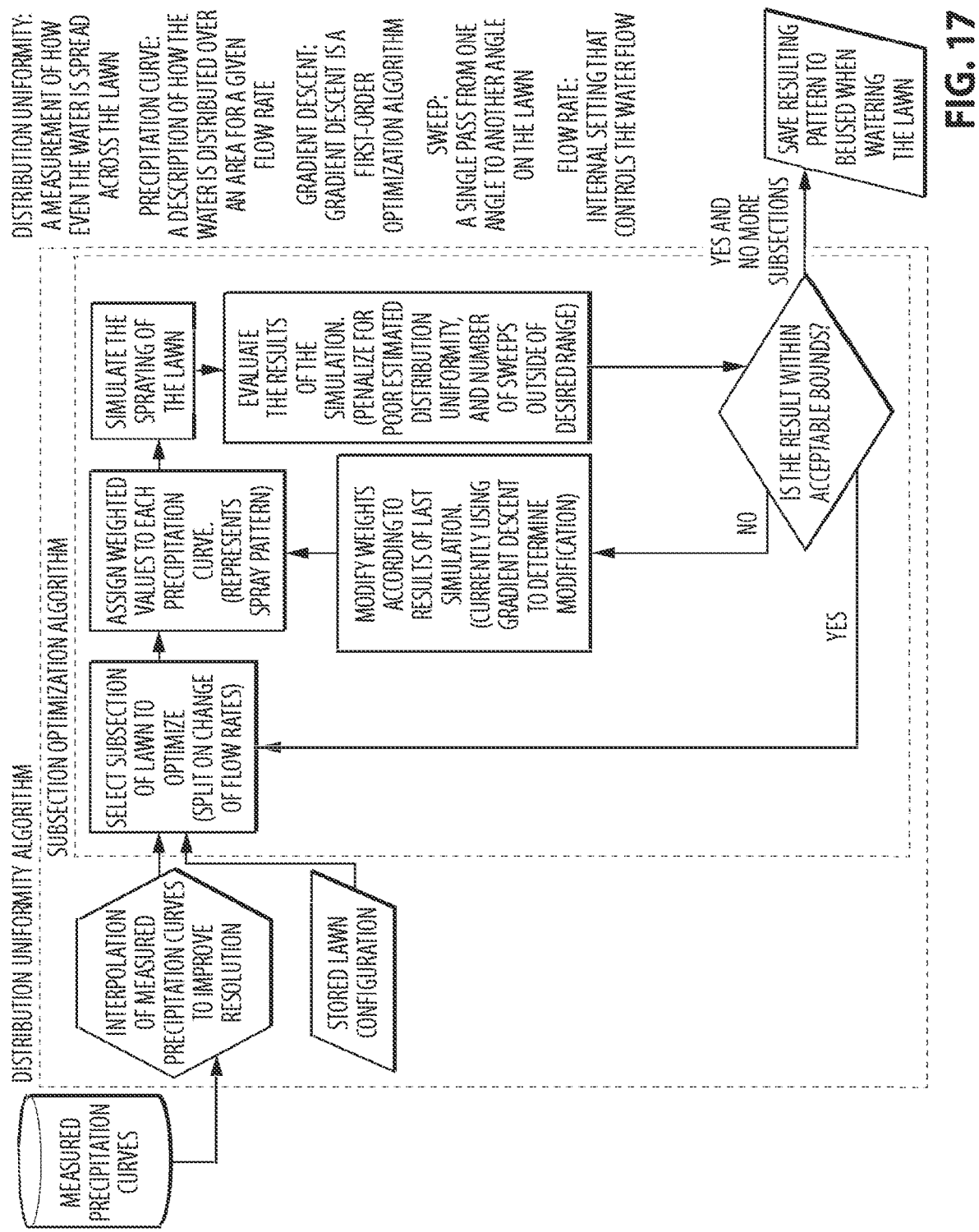
FIG. 17 is a schematic flow chart illustrating an exemplary programmed method for controlling the sprinkler systems disclosed herein, according to embodiments of the present disclosure.
Figure 18:
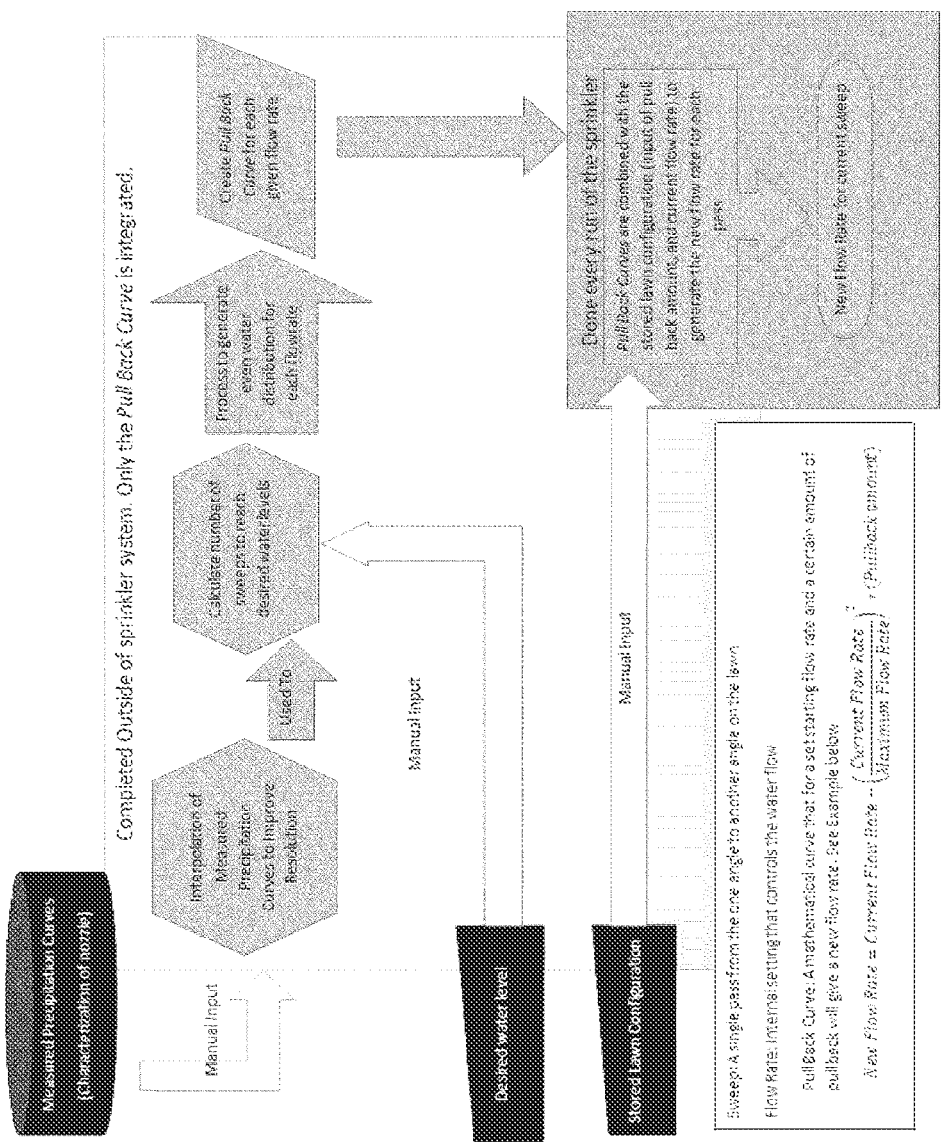
FIG. 18 is a schematic flow chart illustrating an exemplary programmed method for creating a sprinkler spray pattern, according to embodiments of the present disclosure.

The general configuration of a sprinkler system, according to some embodiments, is exemplified in FIG. 16 and comprises at least one pop-up sprinkler head fluidly coupled to a pressurized water supply, the flow rate of the water supply being controlled by a flow control valve assembly of the present disclosure. According to some embodiments, the system can be further controlled by programmable instrumentation for continuously monitoring and modulating the rate of flow of the pressurized water supply into and out of the flow control valve assembly and into and out of the pop-up type sprinkler head. According to such embodiments, the geometry of the water receiving area and its entire perimeter may be programmed into the instrumentation, along with the degree of rotation required for the rotary disc valve in order to vary the wetted radius of the water projected outward from the sprinkler head as the nozzle housing rotates around its axis, so that the water receiving area is uniformly watered over the geometry of its entire area.

According to some embodiments, the area to be irrigated can be a single contiguous area which requires one or more sprinkler apparatus in order to cover the entire area. According to further embodiments, however, the system can be adapted to synchronously irrigate two or more separate areas. According to such embodiments, the water supply may be directed through a fluidly coupled manifold to a plurality of water outlet conduits. Each water outlet conduit of the manifold being placed in fluid communication with a respective sprinkler head to enable selective fluid communication with the water supply. According to certain embodiments, the manifold can further be fluidly connected to one or more flow control valve assemblies of the present disclosure to further control the water flow through the water outlet conduits.

The sprinkler system can further include a system controller or other computer instrumentation to synchronize the operation of each sprinkler apparatus in the system. In further embodiments, the controller or other computer instrumentation is programmable for example, following the logic and steps outlined in FIG. 17. Exemplary components for the controller include a microprocessor, a programmable logic circuit (or "PLC"), an analog control circuit, and electronic components (e.g., transistors, resistors, diodes, etc.) on a circuit board. According to further embodiments, the system can be programmed to establish a watering program that is activated in response to the environmental conditions of the water receiving area. In such embodiments, for example, the system can comprise sensors for continual monitoring of the conditions of the water receiving area in order to determine whether watering is required, and further to establish the parameters for achieving sufficient watering for the particular water receiving area. According to certain embodiments, the sensors are moisture sensors for continually monitoring the soil to determine when watering is required, how it is watered, and for how long it is watered. For example, the system can be configured to monitor one or more environmental conditions to make this determination, including without limitation, moisture level of the soil, temperature of the soil, solar load on the soil, salinity of the soil, wind measurements, and/or precipitation measurements. Once the system determines that watering is required, the system is activated to water the water receiving area for a predetermined time. Moisture values can continue to be monitored and compared to original values in order to determine water absorption by the soil, and/or achievement of target moisture rates.

Future watering cycles can, according to such embodiments, be determined based on information established for the water receiving area as described above. For example in certain soil types where water is not easily retained this may result in multiple short cycles being determined whereas on other soil types it may result in one longer cycle. Furthermore, areas in a water receiving area that are determined by the above described sensors as requiring watering may be selectively watered thereby eliminating arbitrary watering schedules and instead establishing watering schedules that are responsive to the environmental conditions of the given water receiving area, and in this way improving watering efficiency, cost, and control.

Programmable Spray Pattern—Uniformity Distribution Optimization

The spray pattern of a sprinkler apparatus is known to have inconsistencies in uniformity. Inconsistencies in spray pattern uniformity can result in over-watering and/or under-watering of the water receiving area leading to inefficient irrigation. To minimize such inconsistencies, uniformity of water distribution by a sprinkler apparatus of the present disclosure can be programmably controlled, according to some embodiments, using computer instrumentation programmed to create and implement a spray pattern that is designed to compensate for inconsistencies in spray pattern uniformity based on nozzle profile and target precipitation density for the water receiving area. In such embodiments, the rate of flow of the pressurized water supply into and out of the flow control valve assembly and into and out of the pop-up type sprinkler head is modulated to vary the wetted radius of the water projected outward from the sprinkler head with each sweep of the sprinkler, so that the water receiving area is uniformly watered over the geometry of its entire area.

According to such embodiments, the sprinkler apparatus of the present disclosure can comprise computer instrumentation programmed to select a desired target level of precipitation density for the water receiving area; determine the number of sprinkler sweeps needed to achieve the selected precipitation density; pair the number of determined sprinkler sweeps with the selected precipitation density to determine the amount to pull back (i.e., reduce the wetted radius) on each sweep; determine a new flow rate based on the amount of pull back determined; and generate a spray pattern that applies the pulled back flow rates at the calculated rates on each sprinkler sweep to correct the inconsistencies in the uniformity of the spray pattern. In this way, a sprinkler spray pattern can be created that is adjusted with each spray sweep to correct inconsistencies in the uniformity of the spray pattern and thereby further optimize the uniformity of watering the specific water receiving area.

To gain a better understanding of the invention described herein, the following examples are set forth. It will be understood that these examples are intended to describe illustrative embodiments of the invention and are not intended to limit the scope of the invention in any way.

EXAMPLES

Example 1: Sprinkler System Comparative Study

The performance of the irrigation system according to the exemplary embodiments described herein was compared to an industry standard system. The test irrigation system included an electronically driven sprinkler head, variable orifice system nozzle, electronically driven flow control valve, microprocessor controller, and computer instrumentation programmed to implement uniformity distribution optimization control, as described in the present disclosure (the "Test System"). The efficiency of this irrigation system to uniformly irrigate a water receiving area was assessed in comparison to an industry standard system.

Methods and Materials
Test System Specifications:
   Sprinkler Head:
      ¾" NPT inlet connection
      1¾" diameter nozzle housing
      4" pop up height of nozzle housing
   Nozzle:
      Upper Nozzle Orifice size of 0.250"
      Lower Nozzle Orifice size of 0.040"
   Flow Control Valve:
      ¾" NPT inlet and discharge connections
      2.140" diameter bore
      1.800" cavity length
Industry Standard System:
   RainBird 3500 Series Rotor Sprinkler Head
   RainBird Control Valve Model 8605
Uniformity Distribution Optimization Control:

The Test System was programmed to establish water flow rates through the flow control valve, and sprinkler head rotation speeds, that were optimal for each degree of rotation in order to create a uniform spray pattern specific to the water receiving area. In effect, the Test System was programmed to alter the distance that water is sprayed from the head at each rotation in such a way that would correct the inconsistencies in the uniformity of the spray pattern on each pass of the spray.

The spray pattern for the Test System was computer generated using the following method:

1. Select an appropriate nozzle to water the water receiving area;
2. Characterize the spray pattern for the selected nozzle using the nozzle profile;
3. Select a desired target level of precipitation density for the water receiving area;
4. Determine the number of sweeps needed using the data from step 2 to achieve the selected precipitation density determined in step 3;
5. Create Pull-Back Curves for each flow rate by pairing the number of sweeps determined in step 4 with the desired precipitation density selected in step 3 (where Pull-Back Curve is a curve which describes the amount to pull back on each sweep);

6. Determine the Pull-Back Amount from the Pull-Back Curve in step 5;
7. Determine the New Flow Rate using the Pull-Back Amount determined in step 6, where:

New Flow Rate=Current Flow Rate (Current Flow Rate)$^2$*(Pullback amount) Maximum Flow Rate Where New Flow Rate is the flow rate setting that will get sprayed, Current Flow Rate is the setting the flow rate setting for the current angle that the sprinkler is at, Maximum Flow Rate is the maximum flow rate that was measured in step 1, Pullback Amount is the amount of Flow Rate steps as determined from the pull-back curve for the Current Flow Rate.

8. The generated spray pattern is applied to the Test System and the flow rates are pulled back at the calculated rates on each pass to correct the inconsistencies in the uniformity of the nozzle spray pattern.

Water-Receiving Test Area:

The water receiving test area measured 4.6 m×9.2 m (15×30 ft) in an indoor sand based irrigation test lab (Olds College, Alberta). A variable speed pumping station (Pumptronics 8 hp) mounted over an underground cistern operated as the water source. A mainline pipe (10 cm (4") HDPE high density polyethylene DR 11) permanently mounted in the lab was used to connect the pump station to the individual control valves of each respective system. The control valves were then connected to each of the sprinkler heads of the respective system by 1.9 cm diameter (¾") polyethylene pipe (100 psi rating).

(a) Industry Standard System

The industry standard system consisted of six RainBird 3500 Series Sprinkler heads arranged in the water-receiving test area at an individual spacing of 4.6 m. Four sprinkler heads were positioned in the corners of the test area and were set to water at a 90° angle, the remaining two sprinkler heads were positioned in the centre of the test area and set to water at a 180° angle. The piping was dug into the sand based media and the pump pressure was set at 30 psi with a flow rate of 56 gpm.

(b) Test System the

Test System consisted of a single sprinkler head connected to the Test System's flow control valve which was connected to the mainline via a shutoff valve. The single head was positioned in the sand on one side of the test area mid-way between the positioning of the corner heads and next to one of the centre head positions of the Industry Standard System. The piping was dug into the sand based media and the pump pressure was set at 40 psi with a flow rate of 56 gpm.

Watering Cycles Tested (a) Industry Standard System

The RainBird System was operated at a pump pressure set at 30 psi with a flow rate of 56 gpm. Four watering repetitions of 5 minutes each were performed.

(b) Test System

For the comparison test with the RainBird industry standard system, the Test System's optimization program was set up to run at three different speeds i.e., the time to complete a full 180° rotation. The three speed scales were 0.5 speed, 0.7 speed and 1.0 speed. Each speed test was repeated four times.

Length of Time for Each Test Cycle:

A: 0.5 speed scale at 40 psi required a cycle of 7 minutes 18 seconds

B: 0.7 speed scale at 40 psi required a cycle of 9 minutes 45 seconds

C: 1.0 speed scale at 40 psi required a cycle of 13 minutes 35 seconds

Determining Distribution Uniformity and Precipitation Rate:

An irrigation audit of the RainBird Industry Standard system was performed to determine distribution uniformity and precipitation rate. Four rows of catch cans (Irrigation Technology Center, Texas A&M) were installed in the water-receiving test area one metre apart with eight catch cans per row for a total of thirty-two catch cans. Four test runs, that were five minutes in duration, were performed using the RainBird Industry Standard system. The Test System was programmed to operate at three speed scales. Each of the three speed scales was tested four times. Water volume in each catch can was read, recorded, totaled, and averaged for each test run (Irrigation Association).

Distribution Uniformity:

Distribution uniformity was determined by dividing the average catch in the low quarter (i.e., lowest one-fourth of measurements) by the average total catch volume. This provided the distribution in mL which when multiplied by 100 provided the percentage distribution uniformity.

Precipitation Rate:

Precipitation rate was determined by using the prescribed Irrigation Association formula:

$$PR_{ner} = \frac{3.66 \times Vav}{T_r \times A_{CD}}$$

Where:
PR=net precipitation rate
V=average catch volume in mL
T=run time in minutes
A=area in inches squared Results (a) Industry Standard System The average distribution uniformity for the RainBird 3500 industry standard sprinkler system was 61% after performing four watering repetitions of 5 minutes each. The average precipitation rate was 0.6559 in/hour.

(b) Test System The three speed scales tested for the Test System produced the performance results shown in Table 1.

TABLE 1

Comparison of Distribution Uniformity and Precipitation Rate

| SYSTEM | | AVERAGE DISTRIBUTION UNIFORMITY (% DU) | AVERAGE PRECIPITATION RATE (IN/HOUR) |
|---|---|---|---|
| Industry Standard System | | 61 | 0.6559 |
| Test System | A | 70 | 0.2723 |
| | B | 77 | 0.2645 |
| | C | 79 | 0.2743 |

TABLE 1-continued

Comparison of Distribution Uniformity and Precipitation Rate

| SYSTEM | AVERAGE DISTRIBUTION UNIFORMITY (% DU) | AVERAGE PRECIPITATION RATE (IN/HOUR) |
|---|---|---|

A: 0.5 speed scale performing 4 repetitions of a cycle for 7 minutes 18 seconds.
B: 0.7 speed scale performing 4 repetitions of a cycle for 9 minutes 45 seconds.
C: 1.0 speed scale performing 4 repetitions of a cycle for 13 minutes 35 seconds.

CONCLUSIONS

The Test System provided a more uniform distribution of the water than did the industry standard RainBird system. This would be considered an acceptable distribution uniformity by irrigation audit analysts. The RainBird system would likely be considered unacceptable.

While testing both sprinkler systems it was observed that the water droplets created by the Test System were larger than the droplets from the RainBird sprinkler. The immediate significance of larger droplets would be resistance to wind velocity, thus providing a source of water conservation while retaining uniformity of water distribution.

The disclosures of all patents, patent applications, publications and database entries referenced in this specification are hereby specifically incorporated by reference 5 in their entirety to the same extent as if each such individual patent, patent application, publication and database entry were specifically and individually indicated to be incorporated by reference.

Although the invention has been described with reference to certain specific embodiments, various modifications thereof will be apparent to those skilled in the art 10 without departing from the spirit and scope of the invention. All such modifications as would be apparent to one skilled in the art are intended to be included within the scope of the following claims.

The invention claimed is:

1. A sprinkler apparatus comprising:
(a) a pop-up sprinkler head comprising a base housing configured to confiningly receive a pressurized water flow, the pressurized water flow actuating a nozzle housing coupled to the base housing to pop-up into an operating position for discharge of water through at least one nozzle assembly disposed at a top end of the nozzle housing, the at least one nozzle assembly achieving a spray pattern applied to a water receiving area external of said sprinkler apparatus; and
(b) a flow control valve assembly fluidly coupled to the pop-up sprinkler head to controllably supply the pressurized water flow, the flow control valve assembly comprising:
a valve housing defining an inner chamber;
a water inlet formed in the valve housing, the water inlet fluidly coupled to a water supply;
a water outlet formed in the val dive housing, the water outlet fluidly coupled to the base housing of the pop-up sprinkler head; and
a circular disc mounted on a substantially centralized and motor-controlled drive shaft in the inner chamber, wherein the water inlet and the water outlet are on opposite sides of the circular disc, and the circular disc has a single tapered passage wherein rotation of the circular disc within the inner chamber driven by the motor-controlled drive shaft incrementally adjusts the flow control valve between an opened position wherein a widest portion of the tapered passage is axially aligned with the water outlet and a closed position wherein there is no axial alignment of any portion of the tapered passage with the water outlet, thereby controlling the pressurized water flow through the water outlet to the base housing.

2. The sprinkler apparatus according to claim 1, wherein the motor is configured to rotate the drive shaft in steps.

3. The sprinkler apparatus according to claim 2, wherein the motor-controlled drive shaft is operatively coupled to a programmable controller.

4. The sprinkler apparatus according to claim 1, wherein the nozzle housing is sized to slidingly couple with the base housing to pop-up into the operating position or retract into a nested position, the nozzle housing having a bottom end comprising a plurality of orifices to allow passage of the pressurized water flow through the nozzle housing to discharge from the nozzle assemblies at the top end of the nozzle housing, wherein the pressurized water flow received into the base housing is greater than the pressurized water flow through the nozzle housing to create a pressure differential that actuates the nozzle housing to slidingly pop-up into the operating position.

5. The sprinkler apparatus according to claim 4, wherein the nozzle housing is biased in a downward position to maintain the nested position when inoperative.

6. The sprinkler apparatus according to claim 1, further comprising a drive mechanism coupled to the nozzle housing, the drive mechanism comprising a motor driven transmission and a drive train adapted for operatively rotating the nozzle housing within the base housing.

7. The sprinkler apparatus according to claim 6, wherein the drive mechanism is operatively coupled to a programmable controller.

8. The sprinkler apparatus according to claim 1, further comprising an in-ground housing configured to receive and house the pop-up sprinkler head, the in-ground housing comprising a tubular body having a water inlet disposed along the body for connection to the pop-up sprinkler head housed within, a removable lid with an opening sized to allow the pop-up sprinkler head to pop-up therethrough when in an operating position.

9. The sprinkler apparatus according to claim 8, wherein the in-ground housing further comprises a self-draining valve to allow water contained within the housing to be drained.

10. A sprinkler apparatus comprising:
(a) a base housing configured to confiningly receive a pressurized water flow;
(b) a nozzle housing coupled to the base housing, the nozzle housing sized to slidingly couple with the base housing to pop-up into an operating position or retract into a nested position;
(c) an upper nozzle assembly positioned at a top end of the nozzle housing, the upper nozzle assembly comprising a rigid outer frame and a resilient inner nozzle positioned therein, the diameter of the inner nozzle being smaller than the rigid outer frame to provide space for the inner nozzle to distend to a maximum orifice size determined by the circumference of the outer frame, the resilient inner nozzle responsive to the rate of pressurized water flow to distend up to the maximum orifice size to vary the wetted radius of discharged water from the upper nozzle assembly;
(d) a lower nozzle assembly positioned below the upper nozzle assembly at the top end of the nozzle housing, the lower nozzle assembly comprising a vertical slit-shaped aperture through which water is discharged in a curtain effect; and (e) a flow control valve assembly fluidly coupled to the base housing to controllably supply the pressurized water flow; wherein the upper and lower nozzle assemblies together achieve a substantially uniform elliptical spray pattern, wherein the low control valve assembly comprises:

a valve housing defining an inner chamber;

a water inlet in the valve housing, the water inlet fluidly coupled to water supply, a water outlet in the valve housing, the water outlet fluidly coupled to the base housing of the pop-up sprinkler head a circular disc in the inner chamber, the circular disc having a single tapered passage wherein rotation of the circular disc within the inner chamber incrementally adjusts the flow control valve between an opened position and a closed position to control the pressurized water flow through the water outlet to the base housing, wherein the water inlet and the water outlet are located opposite sides of the circular disc.

\* \* \* \* \*